US012305671B2

(12) United States Patent
Tyler

(10) Patent No.: US 12,305,671 B2
(45) Date of Patent: May 20, 2025

(54) ELECTRO-HYDROSTATIC ACTUATOR

(71) Applicant: G.W. Lisk Company, Inc., Clifton Springs, NY (US)

(72) Inventor: Jeffery A. Tyler, Newark, NY (US)

(73) Assignee: G.W. Lisk Company, Inc., Clifton Springs, NY (US)

( * ) Notice: Subject to any disclaimer, the term of this patent is extended or adjusted under 35 U.S.C. 154(b) by 0 days.

(21) Appl. No.: 18/034,249

(22) PCT Filed: Nov. 5, 2021

(86) PCT No.: PCT/US2021/058306
§ 371 (c)(1),
(2) Date: Apr. 27, 2023

(87) PCT Pub. No.: WO2022/099048
PCT Pub. Date: May 12, 2022

(65) Prior Publication Data

US 2023/0392616 A1 Dec. 7, 2023

Related U.S. Application Data

(60) Provisional application No. 63/110,420, filed on Nov. 6, 2020.

(51) Int. Cl.
*F15B 13/044* (2006.01)
*F15B 1/04* (2006.01)
(Continued)

(52) U.S. Cl.
CPC .............. *F15B 13/044* (2013.01); *F15B 1/04* (2013.01); *F15B 15/18* (2013.01);
(Continued)

(58) Field of Classification Search
CPC . F15B 15/18; F15B 2211/7052; H01F 7/1615
See application file for complete search history.

(56) References Cited

U.S. PATENT DOCUMENTS 4,099,450 A * 7/1978 Mase .................... F15B 13/044 91/452
2006/0239846 A1 10/2006 Oda et al.
(Continued)

FOREIGN PATENT DOCUMENTS

CN 101013841 A 8/2007
CN 106641403 B 7/2019
(Continued)

*Primary Examiner* — Thomas E Lazo
(74) *Attorney, Agent, or Firm* — Harter Secrest & Emery LLP; Timothy W. Menasco, Esq.

(57) ABSTRACT

Embodiments of the present disclosure provide a method and apparatus having an actuator assembly. An exemplary actuator assembly includes a cylinder body having a longitudinal axis and a plurality of passageways, and an accumulator fluidly connected to the plurality of passageways. The exemplary actuator assembly also includes a solenoid assembly comprising a core tube, an armature, a first magnet, a second magnet, and an excitation coil, the core tube extending through the longitudinal axis, the core tube having a first ferromagnetic end section and a spaced apart second ferromagnetic end section.

19 Claims, 39 Drawing Sheets

Figure 1:
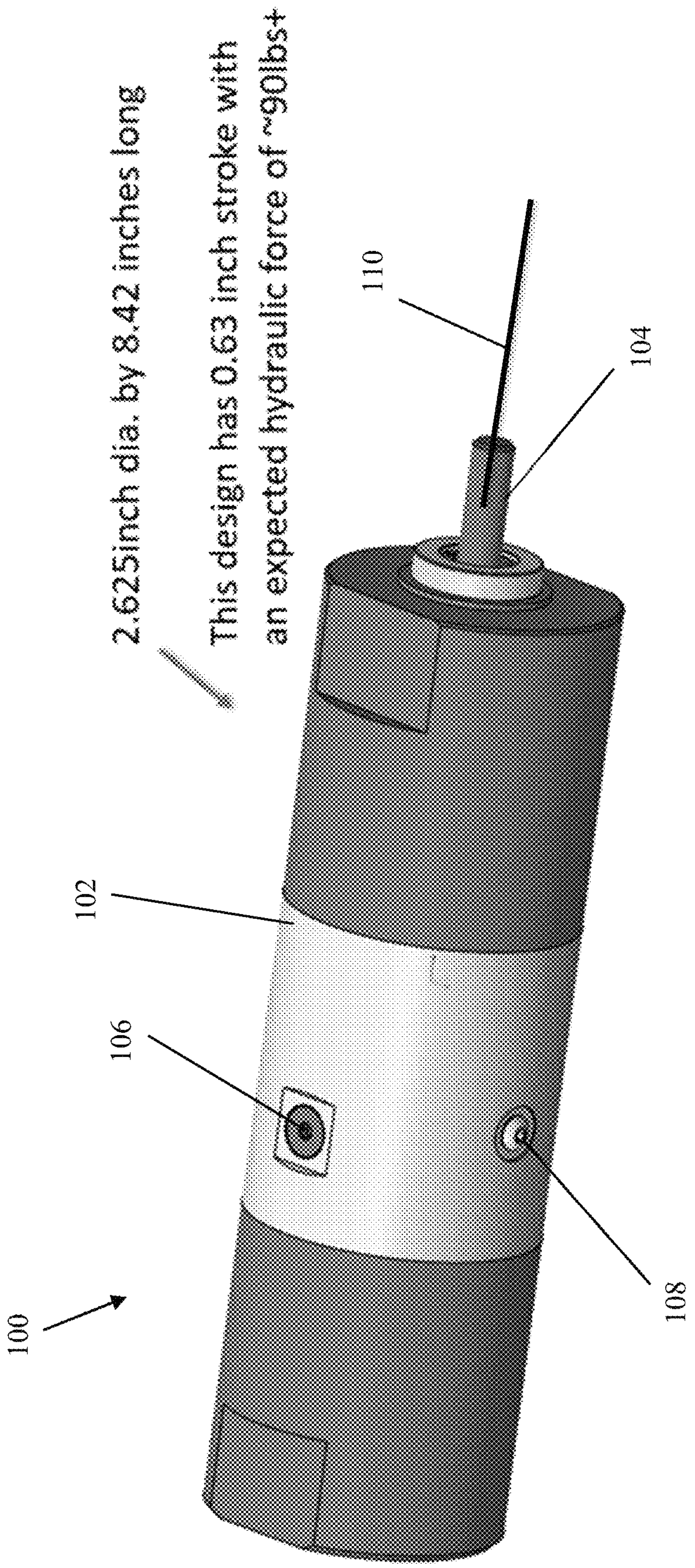

(51) Int. Cl.
*F15B 15/18* (2006.01)
*H01F 7/16* (2006.01)

(52) U.S. Cl.
CPC . *F15B 2211/625* (2013.01); *F15B 2211/7052* (2013.01); *H01F 7/1615* (2013.01)

(56) References Cited

U.S. PATENT DOCUMENTS

| | | | | |
|---|---|---|---|---|
| 2007/0157612 | A1 | 12/2007 | He | |
| 2013/0328649 | A1* | 12/2013 | Robertson | H01F 7/08 335/234 |
| 2017/0097019 | A1 | 4/2017 | Afshari | |
| 2019/0383417 | A1 | 12/2019 | Mazin | |
| 2021/0142936 | A1* | 5/2021 | Tyler | H01F 7/1615 |

FOREIGN PATENT DOCUMENTS

| | | | | |
|---|---|---|---|---|
| CN | 111306118 | A | 6/2020 | |
| WO | WO-2019217439 | A1 * | 11/2019 | H01F 7/081 |

* cited by examiner

ELECTRO-HYDROSTATIC ACTUATOR

BACKGROUND OF THE INVENTION

Field of the Invention

The present disclosure relates to an electro-hydrostatic actuator and more particularly to an electro-hydrostatic actuator pump.

Description of Related Art

Electro-hydrostatic actuators are hydraulic systems with self-contained actuators that operate solely by electrical power. Electro-hydrostatic actuators eliminate the need to separate hydraulic pumps and tubing. An electro-hydrostatic actuator having a self-contained design can help improve safety and reliability of the systems.

BRIEF SUMMARY OF THE INVENTION

In view of the foregoing, it is an object of the present disclosure to provide a method and apparatus.

A first exemplary embodiment of the present disclosure provides an actuator assembly including cylinder body having a longitudinal axis and a plurality of passageways, and an accumulator fluidly connected to the plurality of passageways, the accumulator operable to maintain a fluid under pressure and to urge the fluid through the plurality of passageways. The actuator assembly further includes a moveable cylinder fluidly connected to the plurality of passageways, the moveable cylinder operable to move through the longitudinal axis in response to pressure from the fluid. The actuator assembly still further includes a solenoid assembly comprising a core tube, an armature, a first magnet, a second magnet, and an excitation coil, the core tube extending through the longitudinal axis, the core tube having a first ferromagnetic end section and a spaced apart second ferromagnetic end section, the armature having a rod extending through the longitudinal axis, the armature disposed longitudinally between the first ferromagnetic end section and the spaced apart second ferromagnetic end section, the first magnet and the second magnet disposed radially outside the core tube, the first magnet separated from the second magnet by a ferromagnetic spacer, the excitation coil located radially outward from the first and second magnets A second exemplary embodiment of the present disclosure provides a method. The method includes providing a cylinder body having a longitudinal axis and a plurality of passageways, and providing an accumulator fluidly connected to the plurality of passageways, the accumulator operable to maintain a fluid under pressure and to urge the fluid through the plurality of passageways. The method further includes providing a moveable cylinder fluidly connected to the plurality of passageways, the moveable cylinder operable to move through the longitudinal axis in response to pressure from the fluid. The method still further includes providing a solenoid assembly comprising a core tube, an armature, a first magnet, a second magnet, and an excitation coil, the core tube extending through the longitudinal axis, the core tube having a first ferromagnetic end section and a spaced apart second ferromagnetic end section, the armature having a rod extending through the longitudinal axis, the armature disposed longitudinally between the first ferromagnetic end section and the spaced apart second ferromagnetic end section, the first magnet and the second magnet disposed radially outside the core tube, the first magnet separated from the second magnet by a ferromagnetic spacer, the excitation coil located radially outward from the first and second magnets.

A third exemplary embodiment of the present disclosure provides an apparatus. The apparatus includes a fixed body having a first side and an opposite second side, the fixed body defining at least one opening, the at least one opening providing a passageway between the first side and the opposite second side. The apparatus further includes a flexible body having a flexible first side and an opposite flexible second side, the flexible body having at least one flexible portion and a spaced apart stationary portion, the at least one flexible portion operable to flex with respect to the stationary portion such that at least one passageway from the flexible first side to the opposite flexible second side is formed when the at least one flexible portion is in a flexed position.

A fourth exemplary embodiment of the present disclosure provides an actuator assembly. The actuator assembly includes a cylinder body having a plurality of passageways, and a first accumulator fluidly connected to the plurality of passageways, the first accumulator operable to maintain a fluid under pressure and to urge the fluid through the plurality of passageways. The actuator assembly further includes a second accumulator fluidly connected to the plurality of passageways, the second accumulator operable to maintain a fluid under pressure and to urge the fluid through the plurality of passageways, the second accumulator fluidly connected to the first accumulator through the plurality of passageways and operable to receive fluid from the first accumulator, and a moveable cylinder fluidly connected to the plurality of passageways, the moveable cylinder operable to move in response to pressure from the fluid. The actuator assembly still further includes a solenoid assembly comprising a core tube, an armature, a first magnet, a second magnet, and an excitation coil, the core tube extending through a longitudinal axis, the core tube having a first ferromagnetic end section and a spaced apart second ferromagnetic end section, the armature having a rod extending through the longitudinal axis, the armature disposed longitudinally between the first ferromagnetic end section and the spaced apart second ferromagnetic end section, the first magnet and the second magnet disposed radially outside the core tube, the first magnet separated from the second magnet by a ferromagnetic spacer, the excitation coil located radially outward from the first and second magnets.

The following will describe embodiments of the present disclosure, but it should be appreciated that the present disclosure is not limited to the described embodiments and various modifications of the disclosure are possible without departing from the basic principle. The scope of the present disclosure is therefore to be determined solely by the appended claims.

BRIEF DESCRIPTION OF THE SEVERAL VIEWS OF THE DRAWING(S)

FIG. 1 presents a perspective view of an exemplary device suitable for use in practicing exemplary embodiments of this disclosure.

Figure 2:
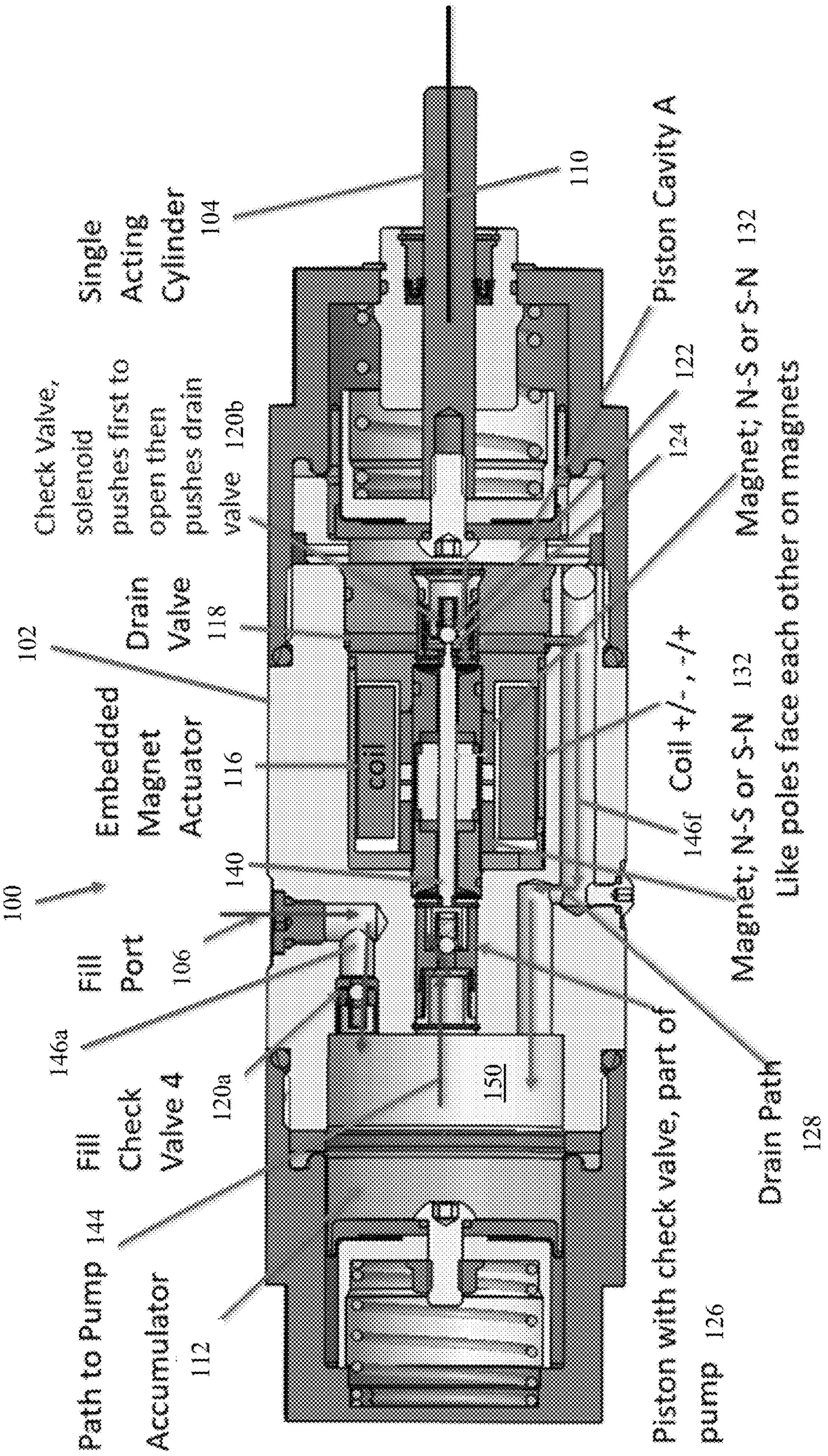

FIG. 2 presents a cross-sectional view of an exemplary device suitable for use in practicing exemplary embodiments of this disclosure.

Figure 3:
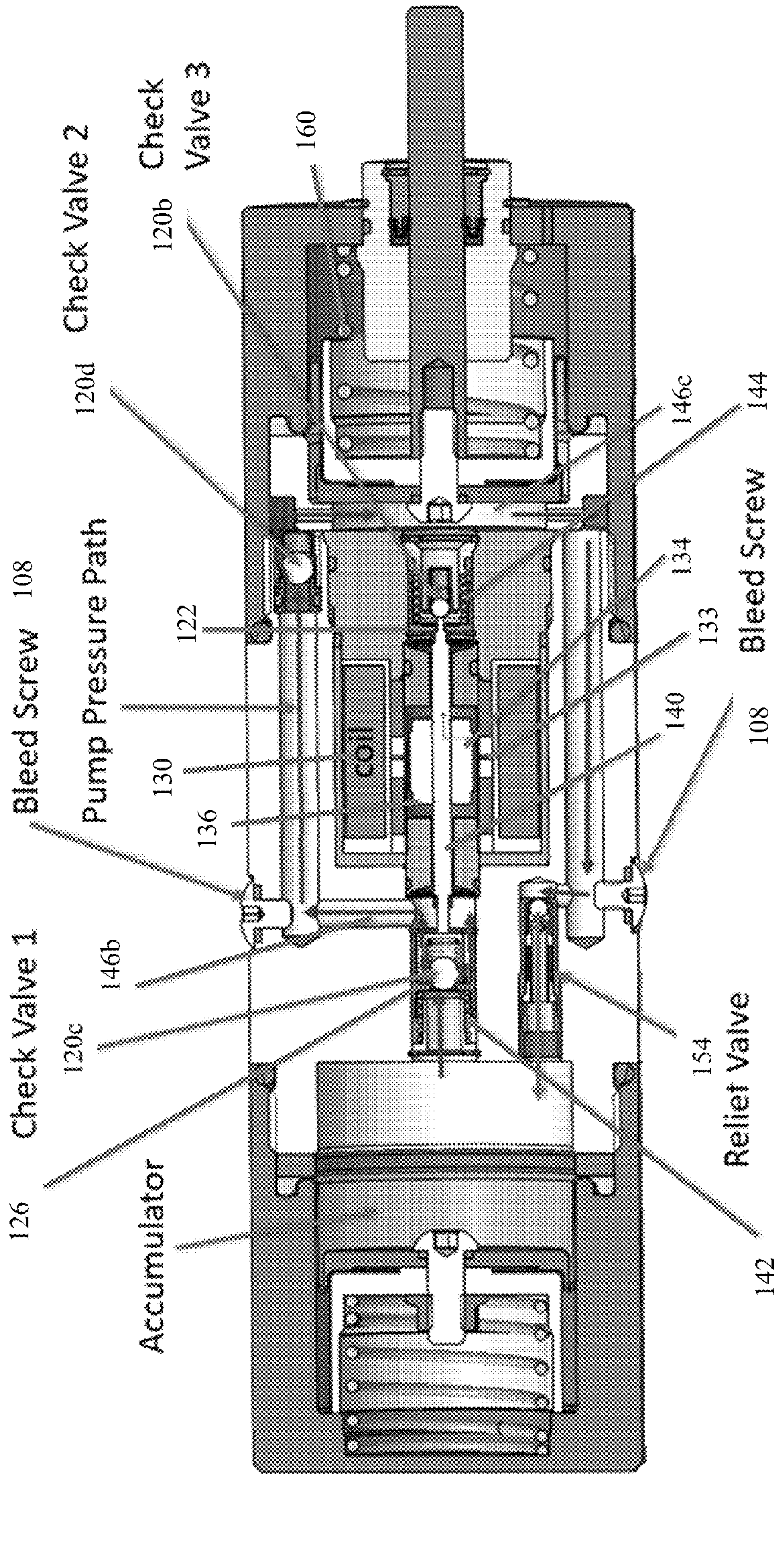

FIG. 3 presents a cross-sectional view of an embodiment of an exemplary device suitable for use in practicing exemplary embodiments of this disclosure.

Figure 4:
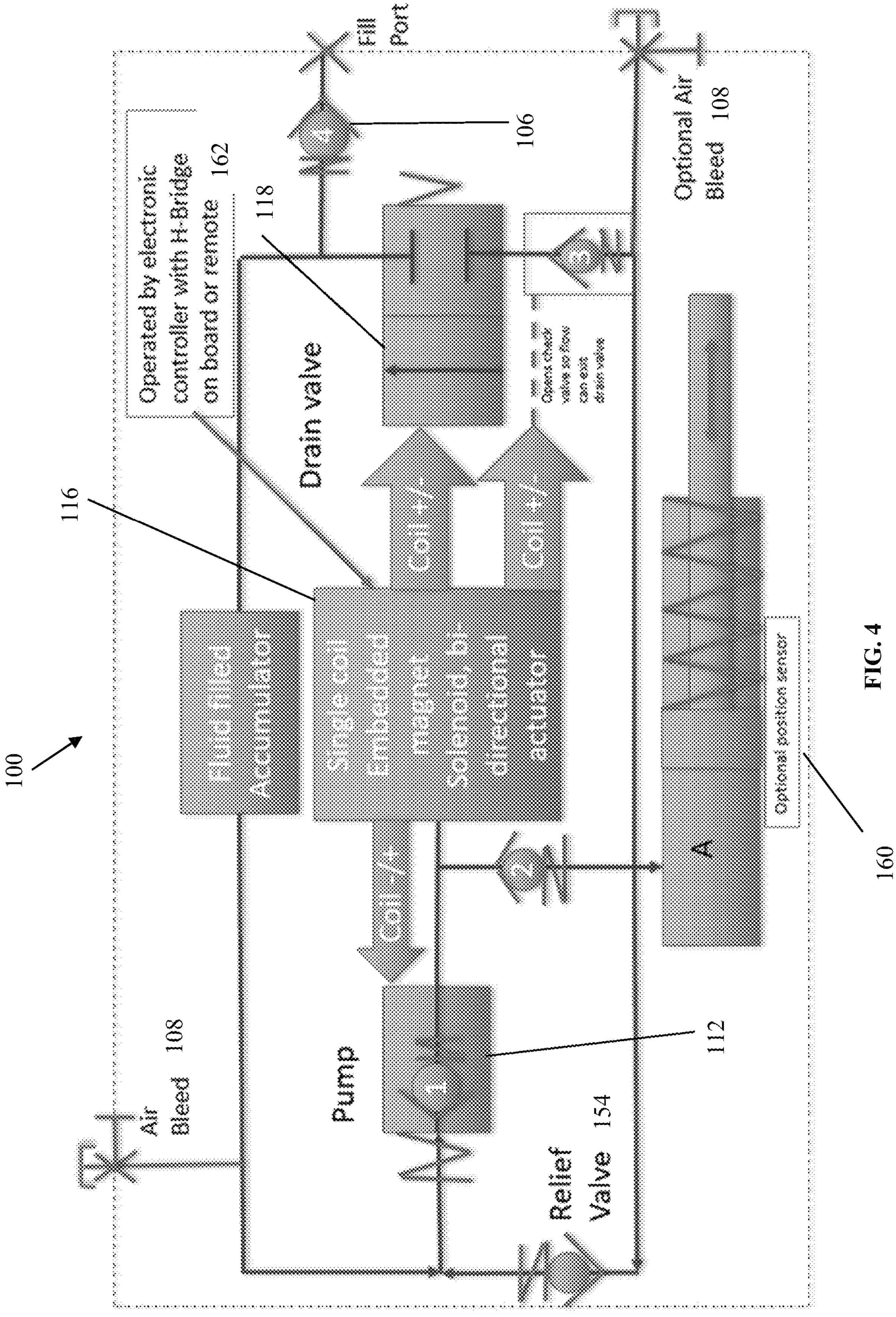

FIG. 4 presents a block diagram of an exemplary device suitable for use in practicing exemplary embodiments of this disclosure.

Figure 5:
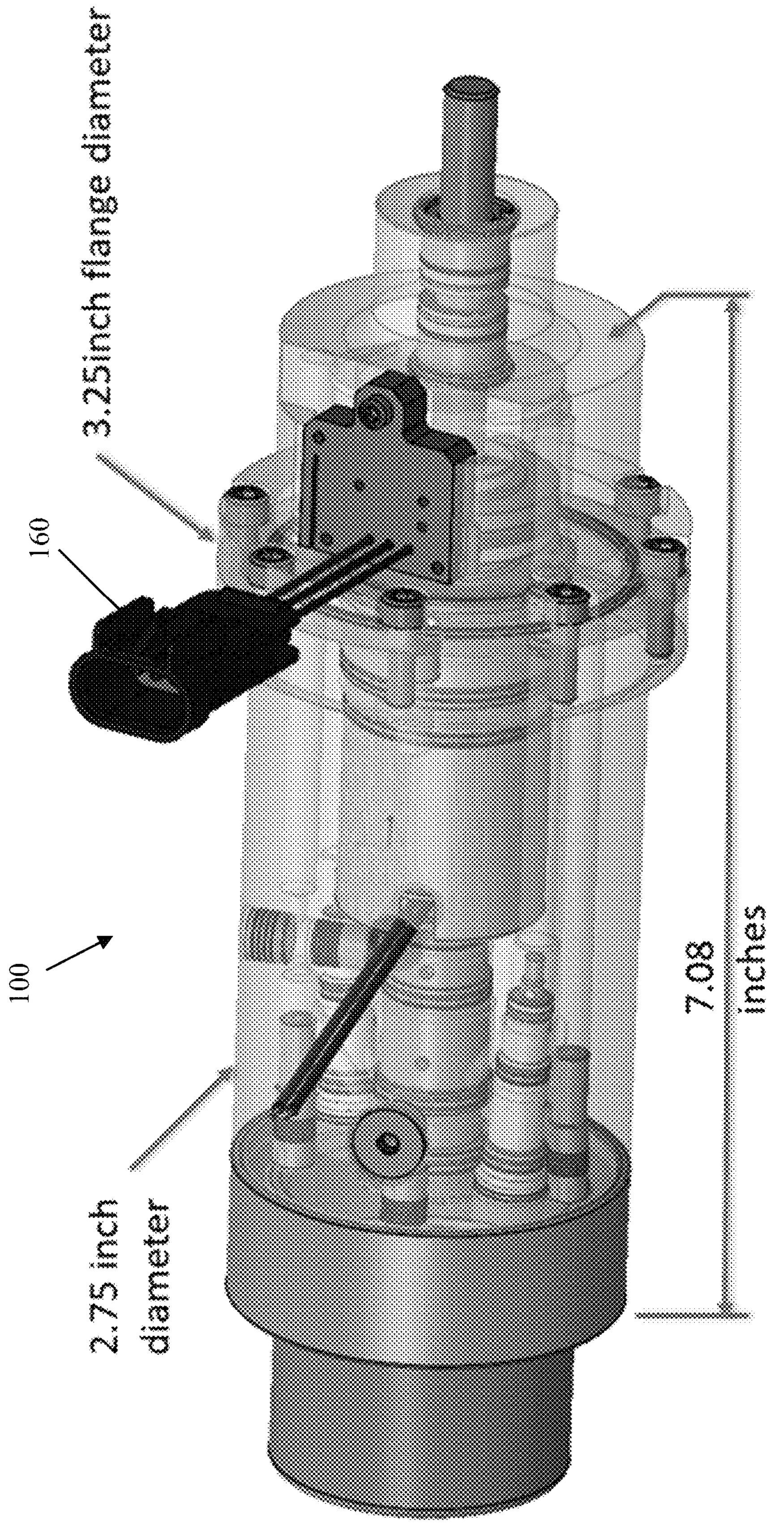

FIG. 5 presents a perspective interior view of an exemplary device suitable for use in practicing exemplary embodiments of this disclosure.

Figure 6:
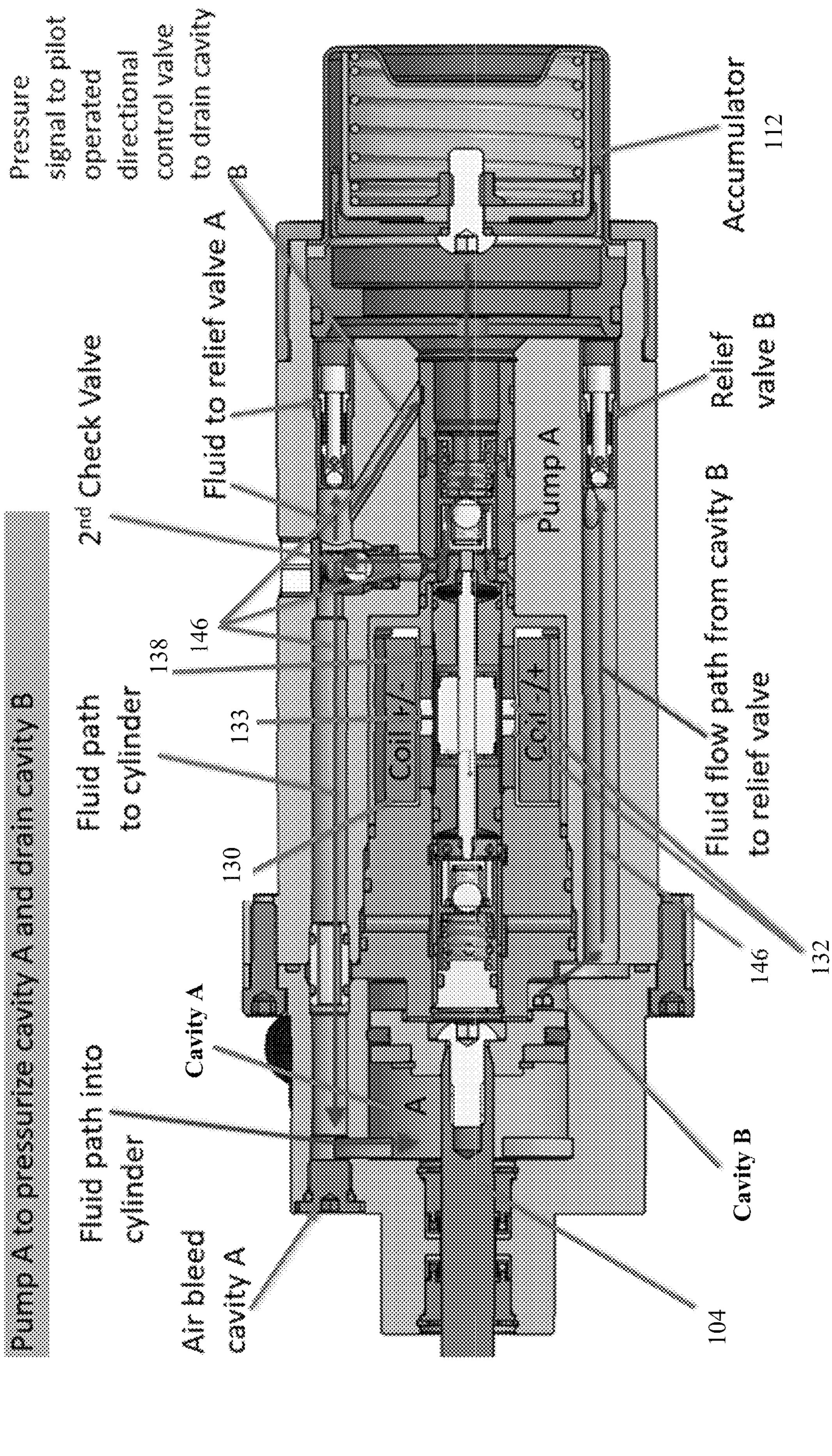

FIG. 6 presents another cross-sectional of an exemplary device suitable for use in practicing exemplary embodiments of this disclosure.

Figure 7:
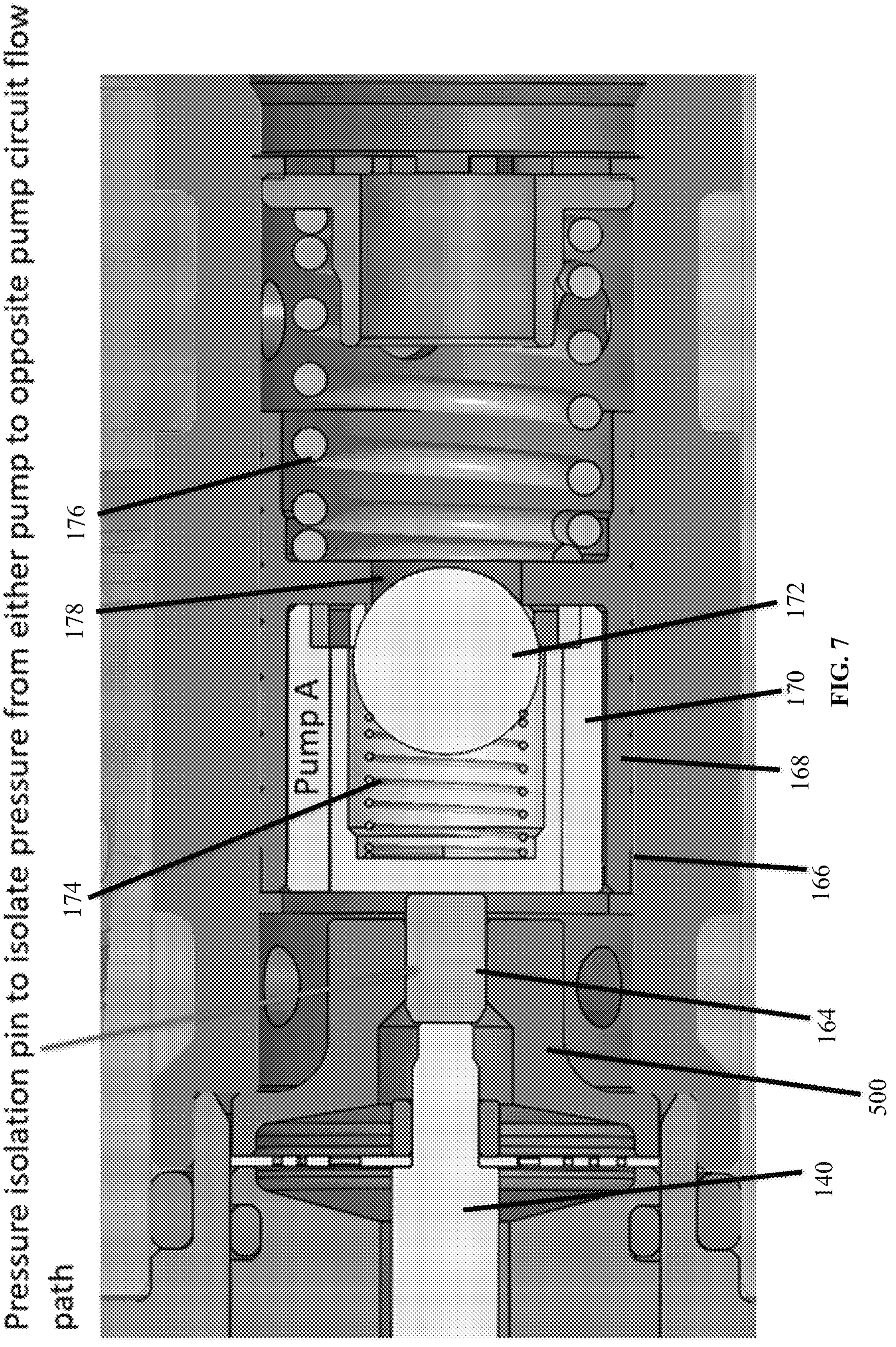

FIG. 7 presents a close-up cross-sectional view of an exemplary device suitable for use in practicing exemplary embodiments of this disclosure.

Figure 8A:
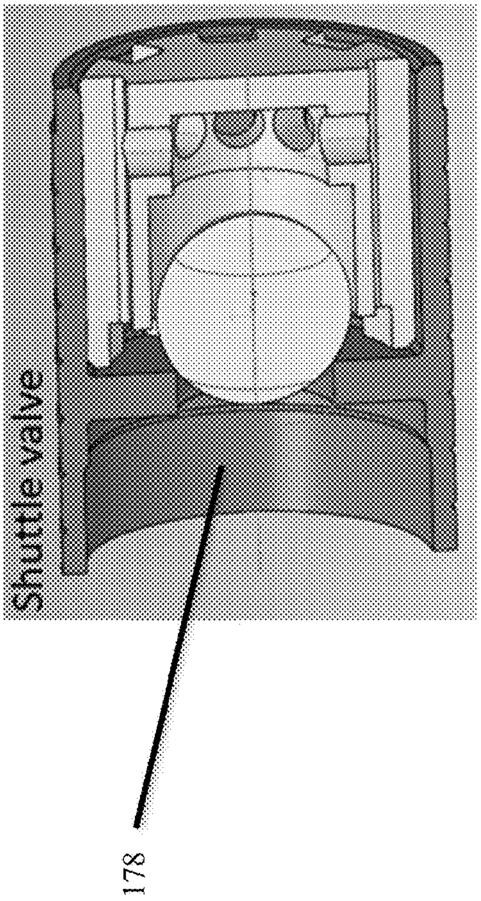

FIG. 8*a* presents a close-up cross-sectional view of an exemplary shuttle valve suitable for use in practicing exemplary embodiments of this disclosure.

Figure 8B:
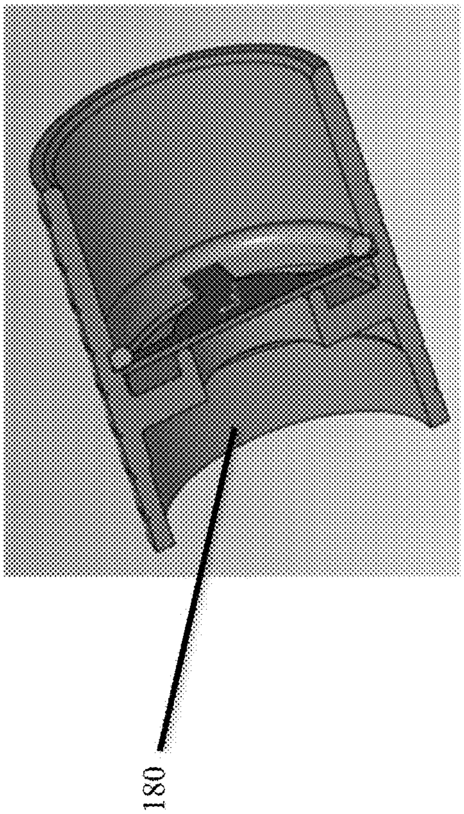

FIG. 8*b* presents a close-up cross-sectional view of a portion of an exemplary reed valve suitable for use in practicing exemplary embodiments of this disclosure.

Figure 9:
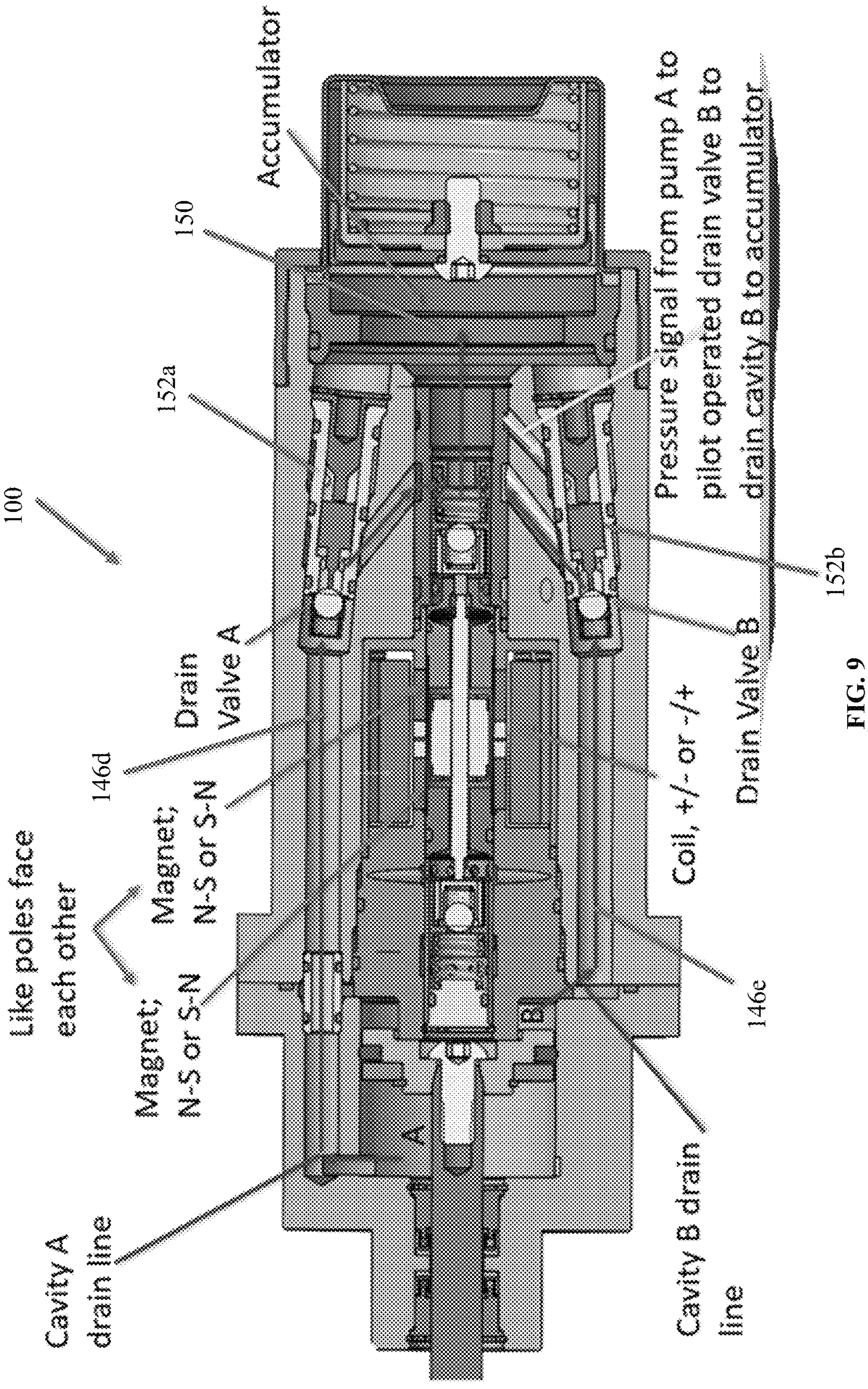

FIG. 9 presents a cross-sectional view of an alternative exemplary device suitable for use in practicing exemplary embodiments of this disclosure.

Figure 10:
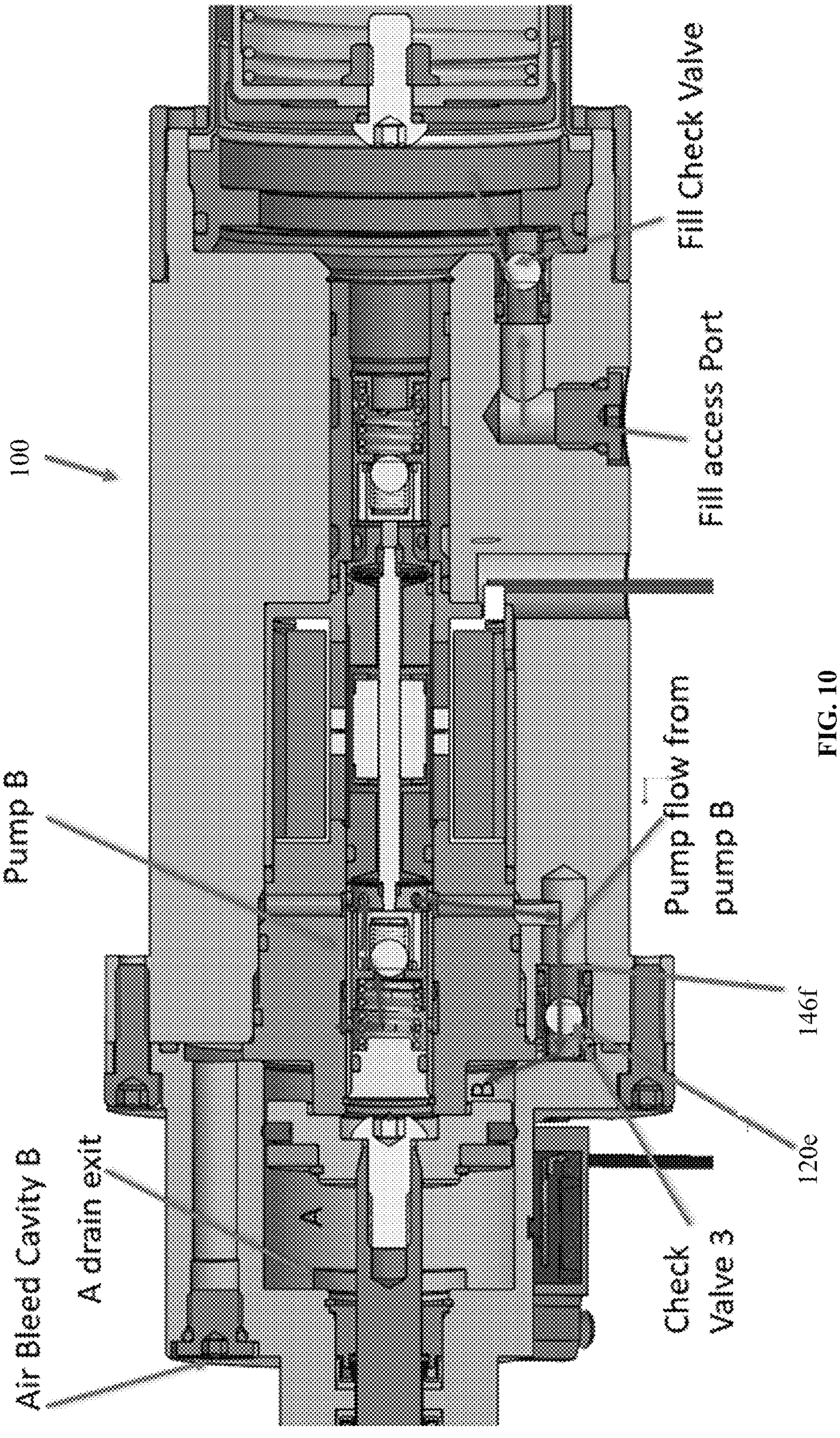

FIG. 10 presents another cross-sectional view of the alternative exemplary device suitable for use in practicing exemplary embodiments of this disclosure.

Figure 11:
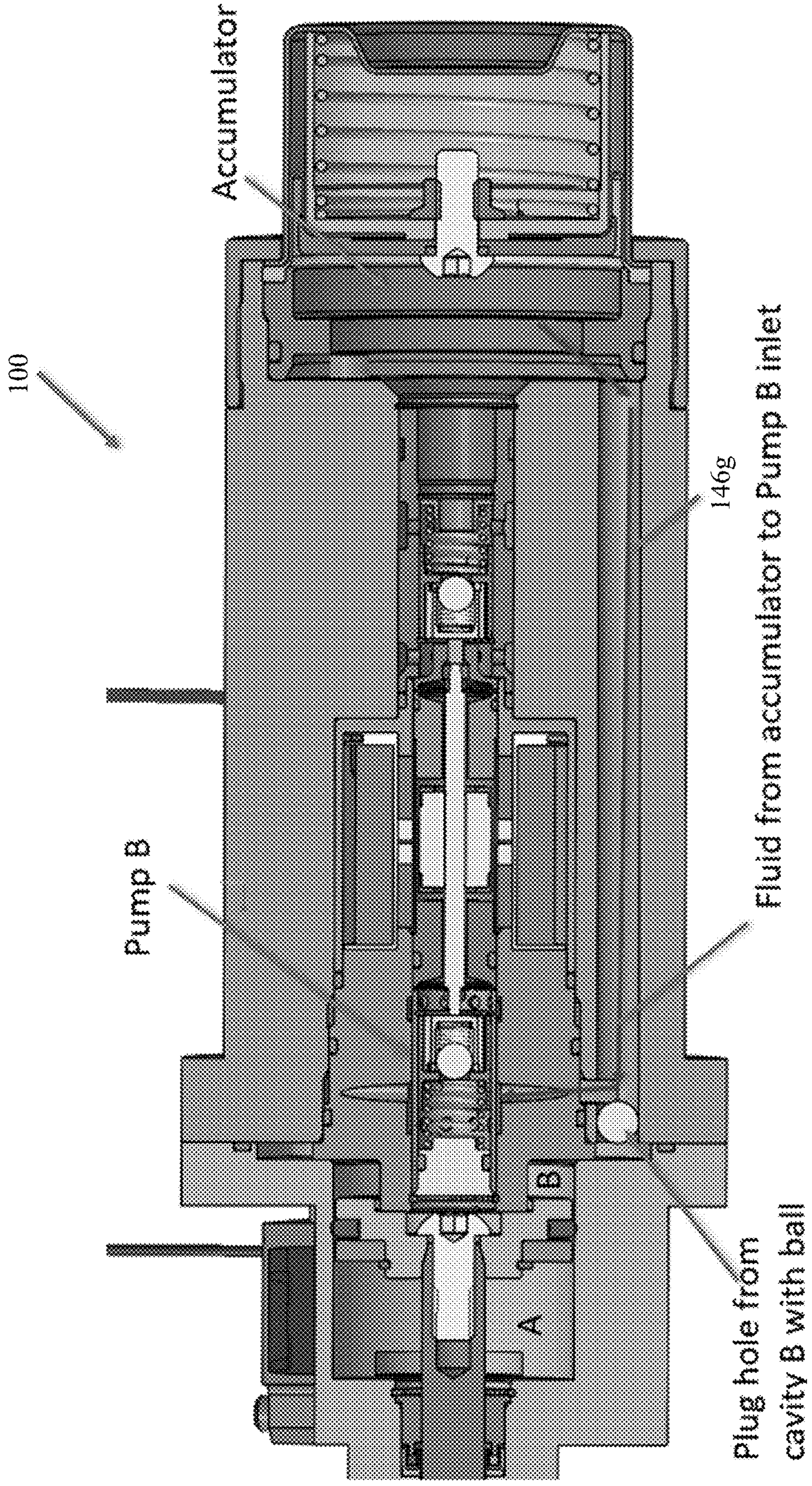

FIG. 11 presents yet another cross-sectional view of the alternative exemplary device suitable for use in practicing exemplary embodiments of this disclosure.

Figure 12:
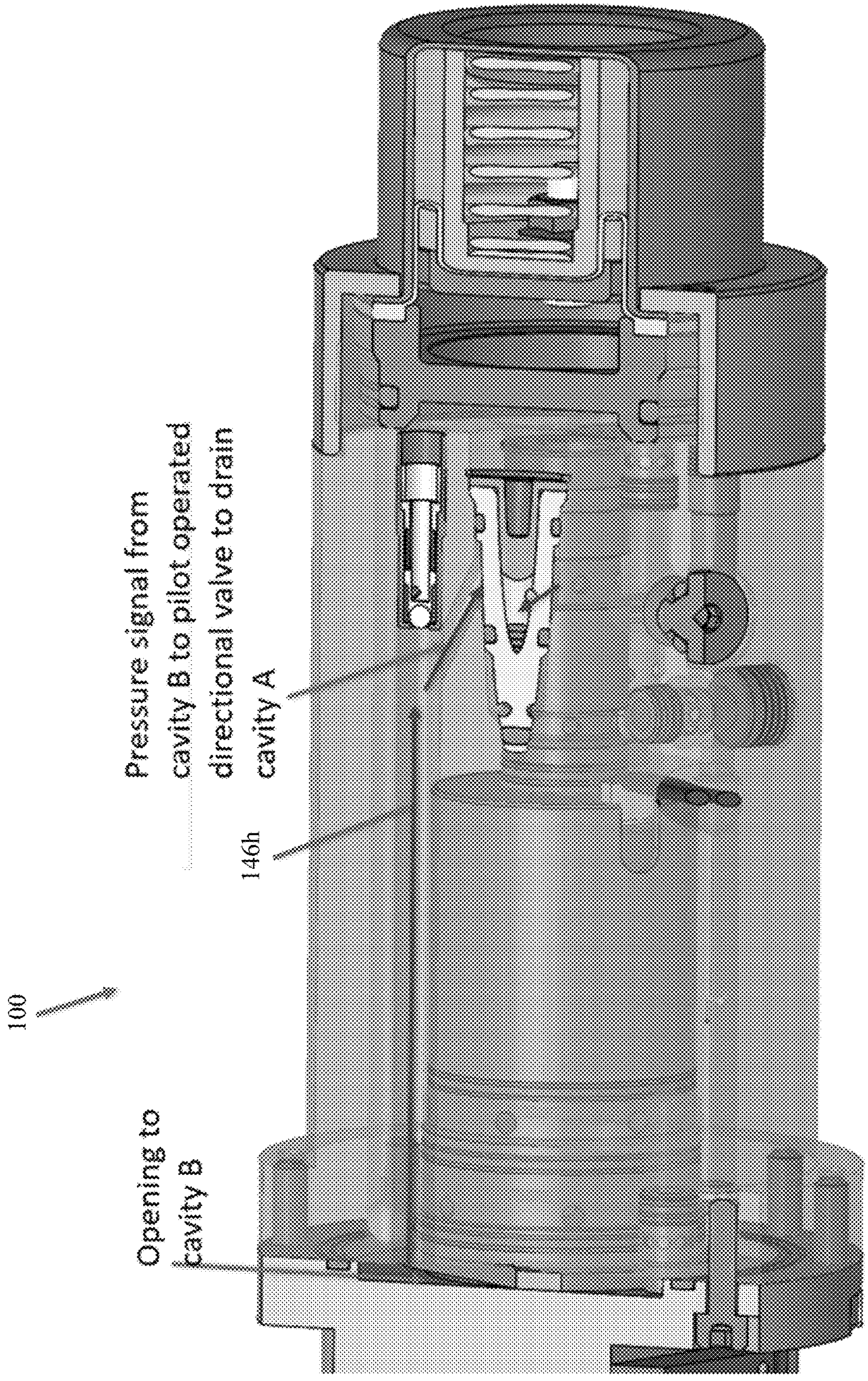

FIG. 12 presents a perspective interior view of the alternative exemplary device suitable for use in practicing exemplary embodiments of this disclosure.

Figure 13:
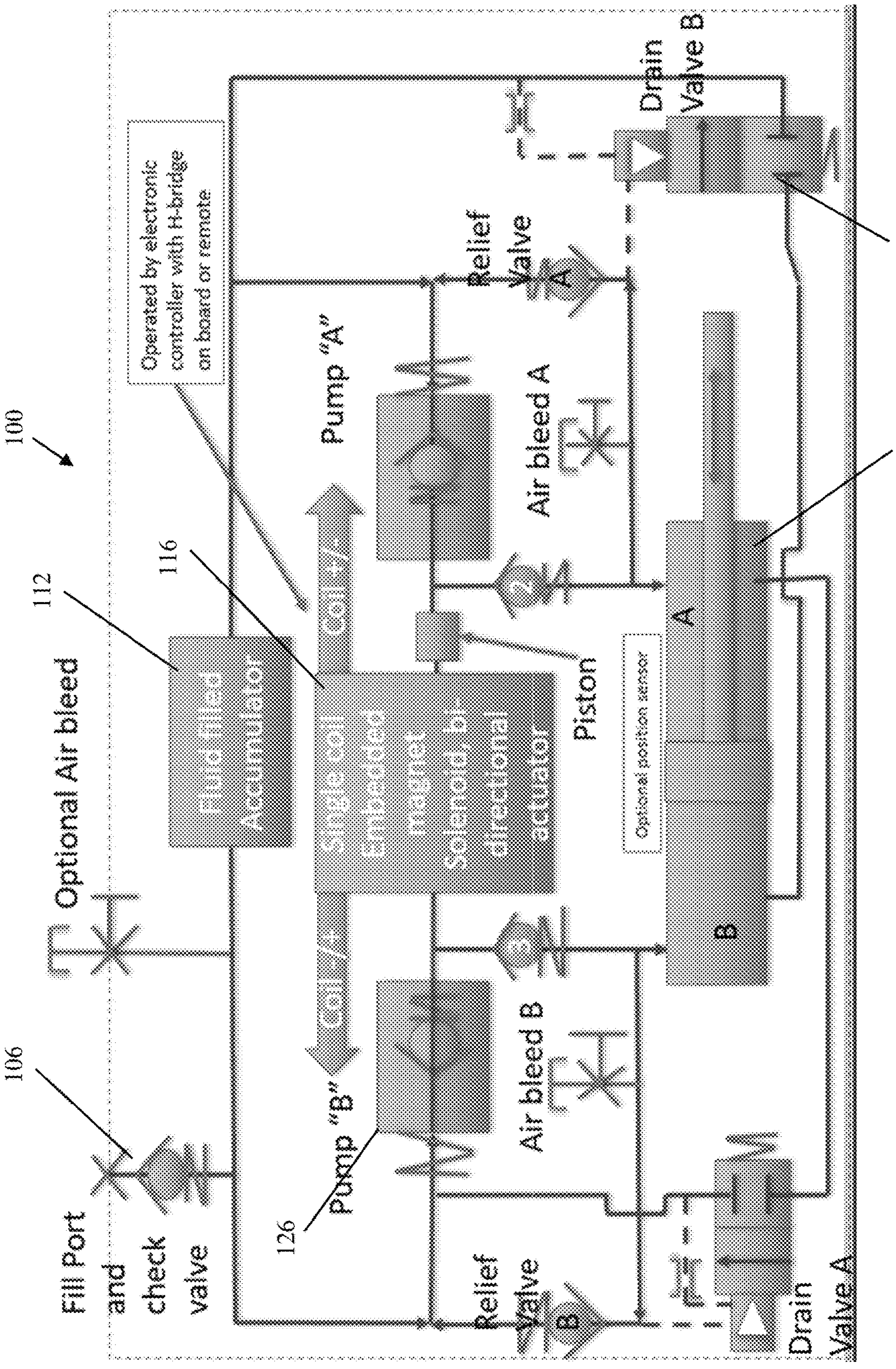

FIG. 13 presents a block diagram of the alternative exemplary device suitable for use in practicing exemplary embodiments of this disclosure.

Figure 14:
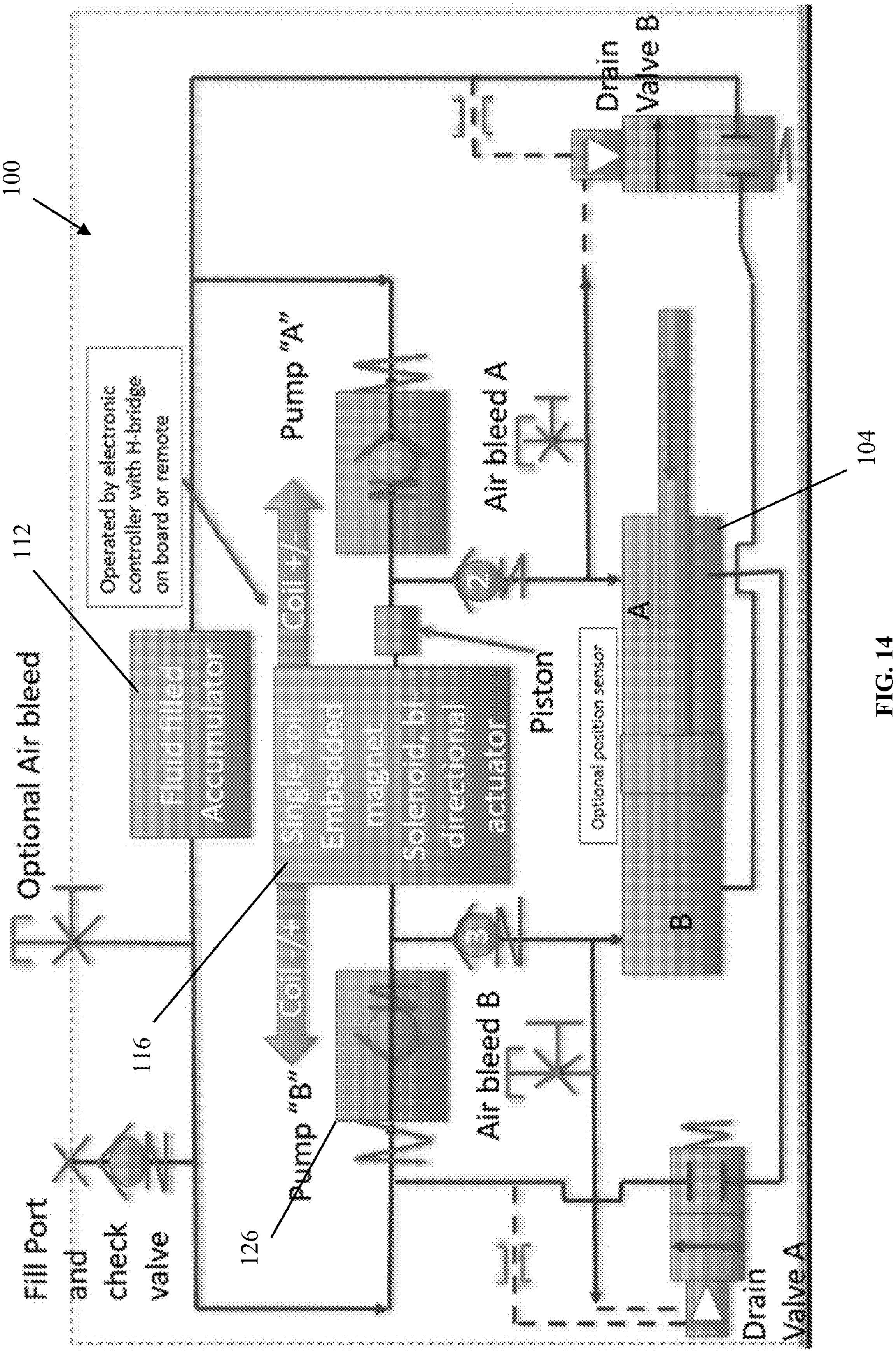

FIG. 14 presents another block diagram of the alternative exemplary device suitable for use in practicing exemplary embodiments of this disclosure.

Figure 15:
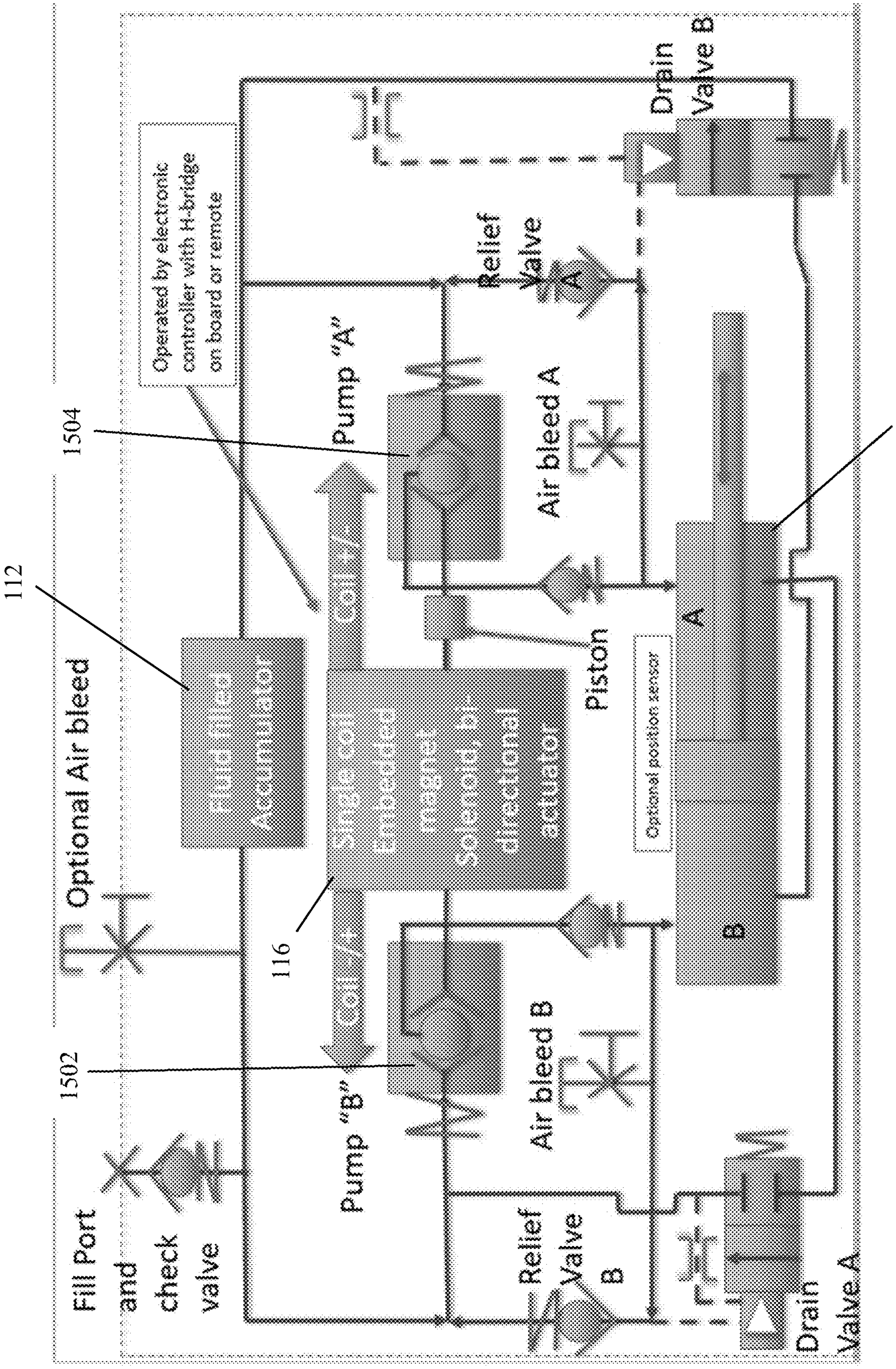

FIG. 15 presents yet another block diagram of the alternative exemplary device suitable for use in practicing exemplary embodiments of this disclosure.

Figure 16:
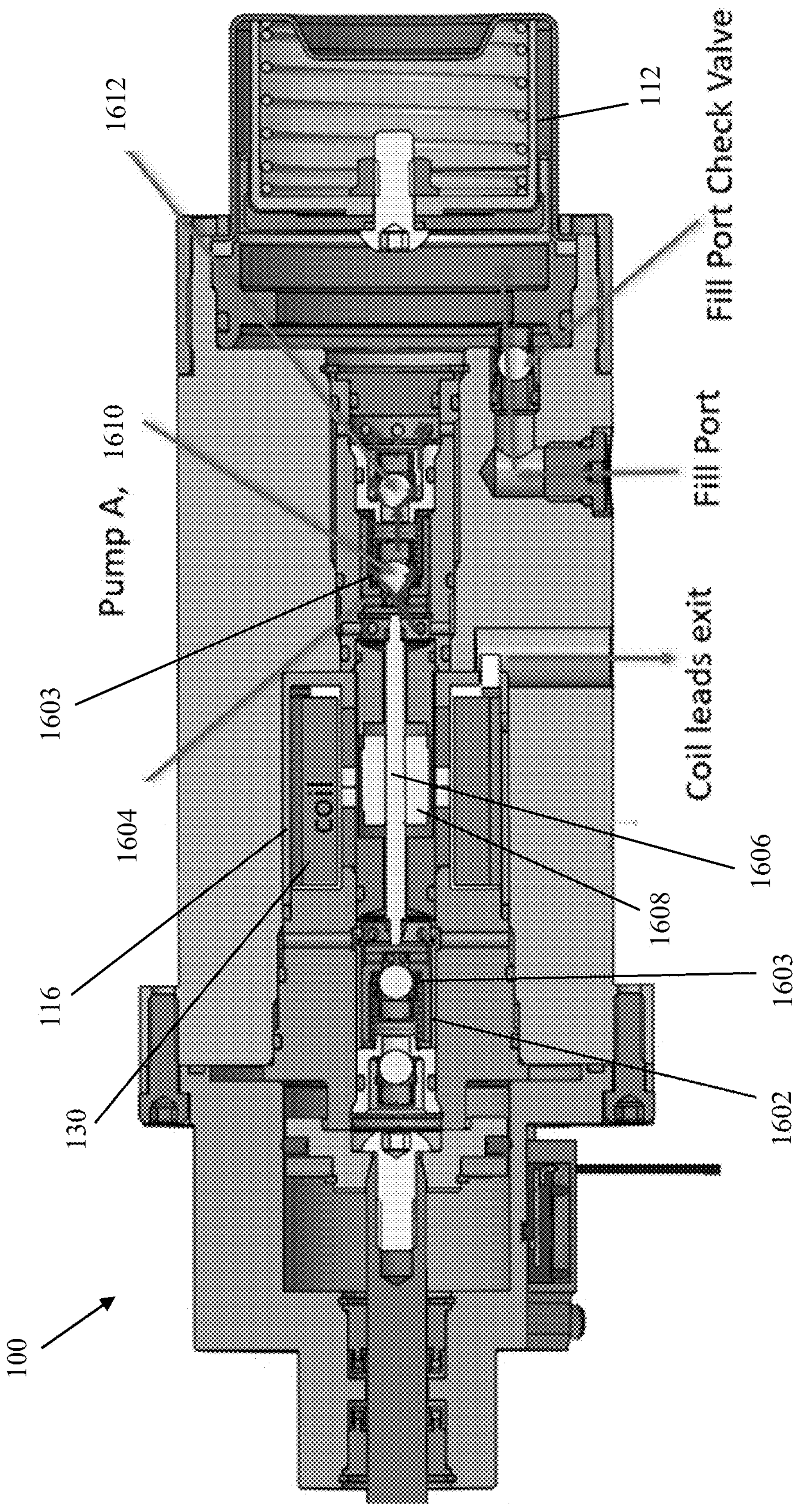

FIG. 16 presents another cross-sectional view of the alternative exemplary device illustrating flow paths suitable for use in practicing exemplary embodiments of this disclosure.

Figure 17:
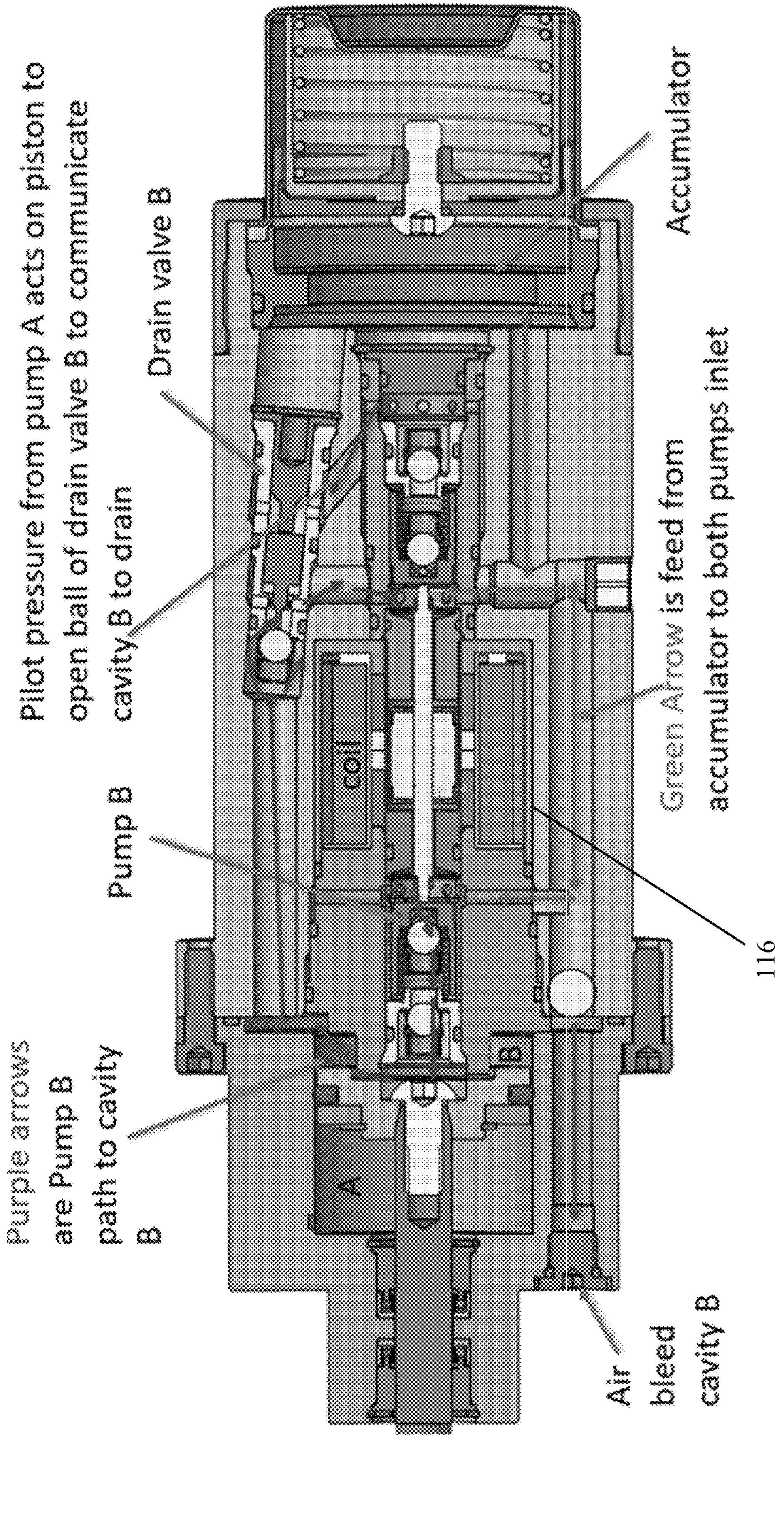

FIG. 17 presents another cross-sectional view of the alternative exemplary device illustrating further flow paths suitable for use in practicing exemplary embodiments of this disclosure.

Figure 18:
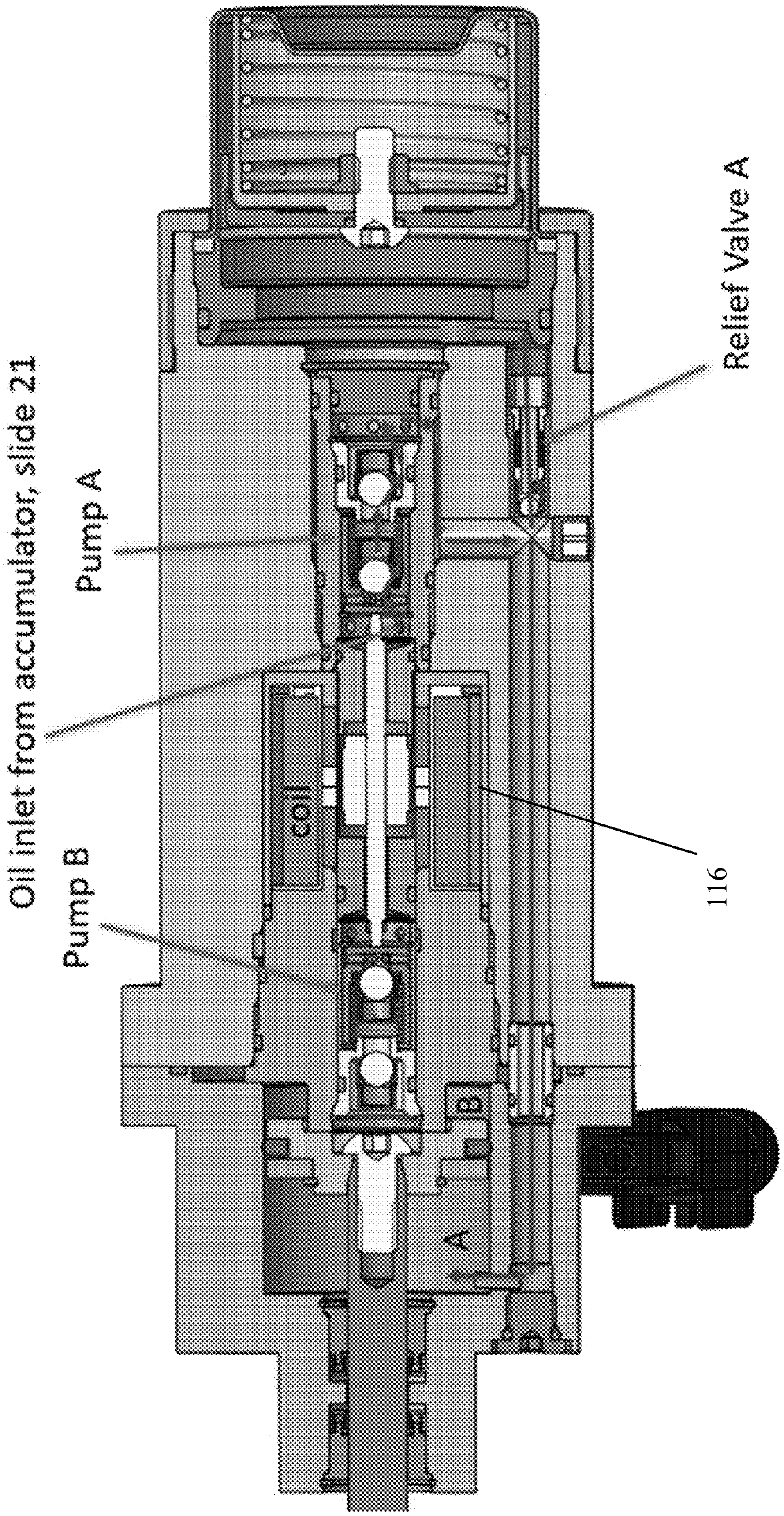

FIG. 18 presents another cross-sectional view of the alternative exemplary device illustrating further flow paths suitable for use in practicing exemplary embodiments of this disclosure.

Figure 19:
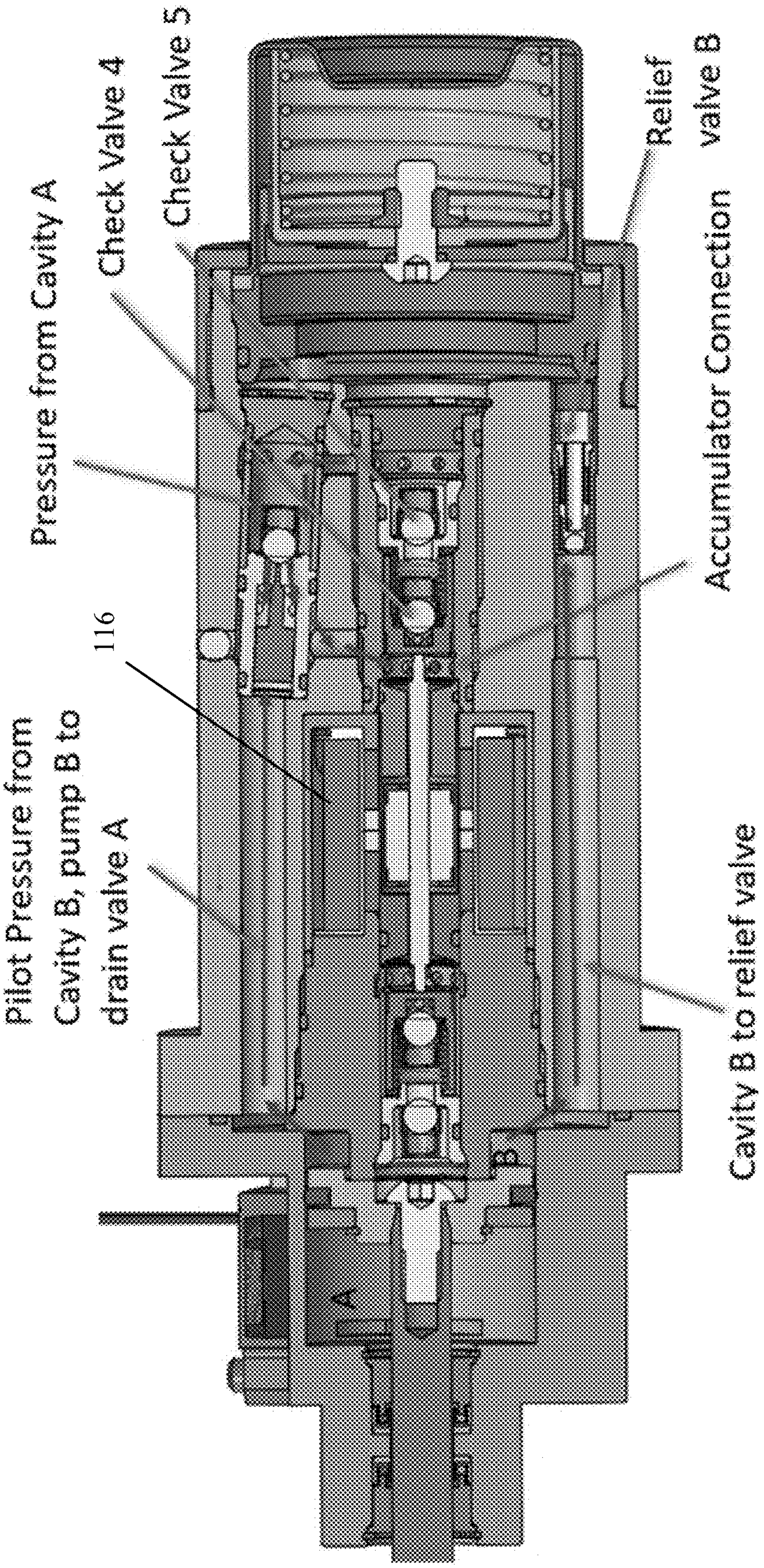

FIG. 19 presents another cross-sectional view of the alternative exemplary device illustrating yet further flow paths suitable for use in practicing exemplary embodiments of this disclosure.

Figure 20:
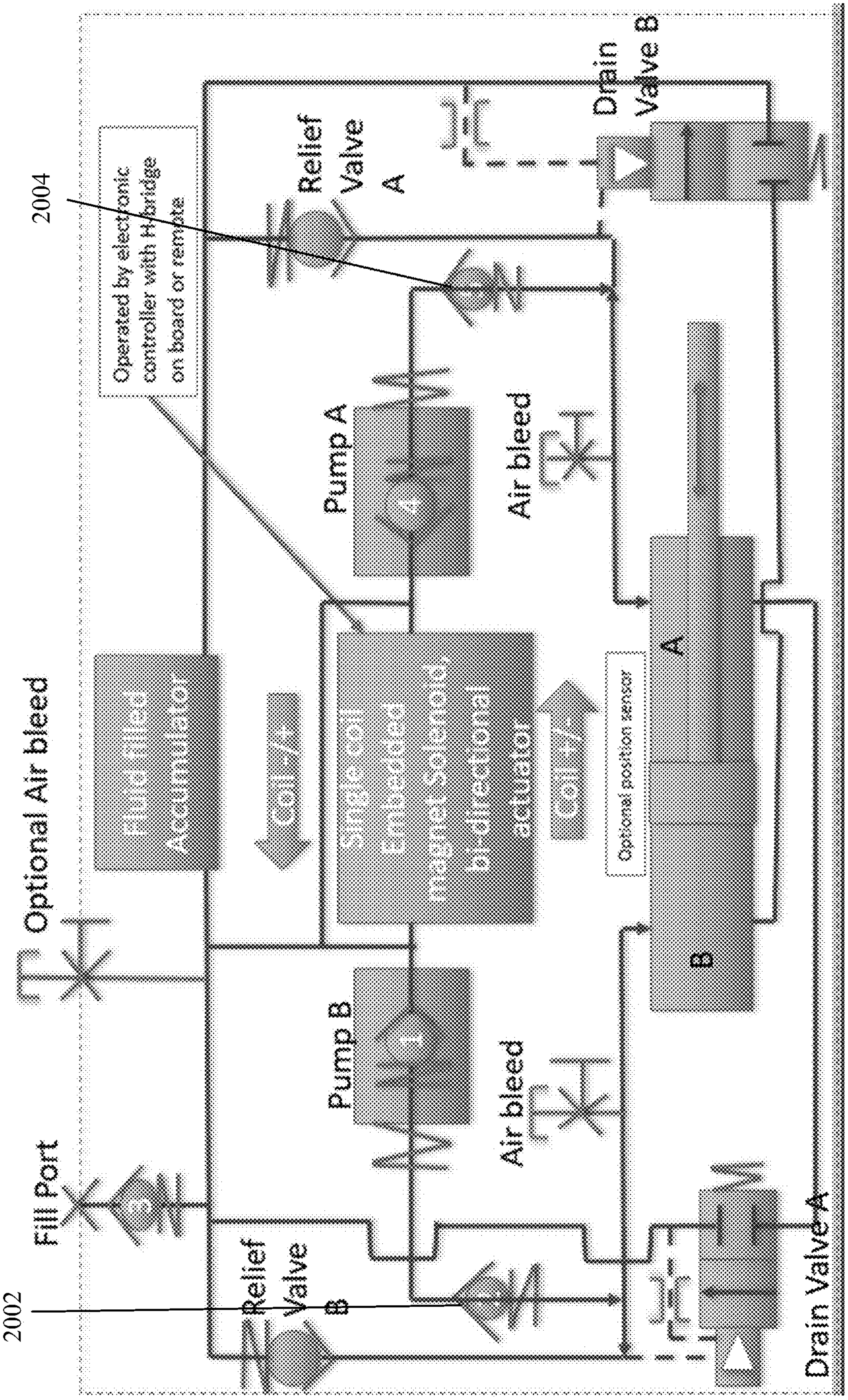

FIG. 20 presents a block diagram of another exemplary device illustrating flow paths suitable for use in practicing exemplary embodiments of this disclosure.

Figure 21:
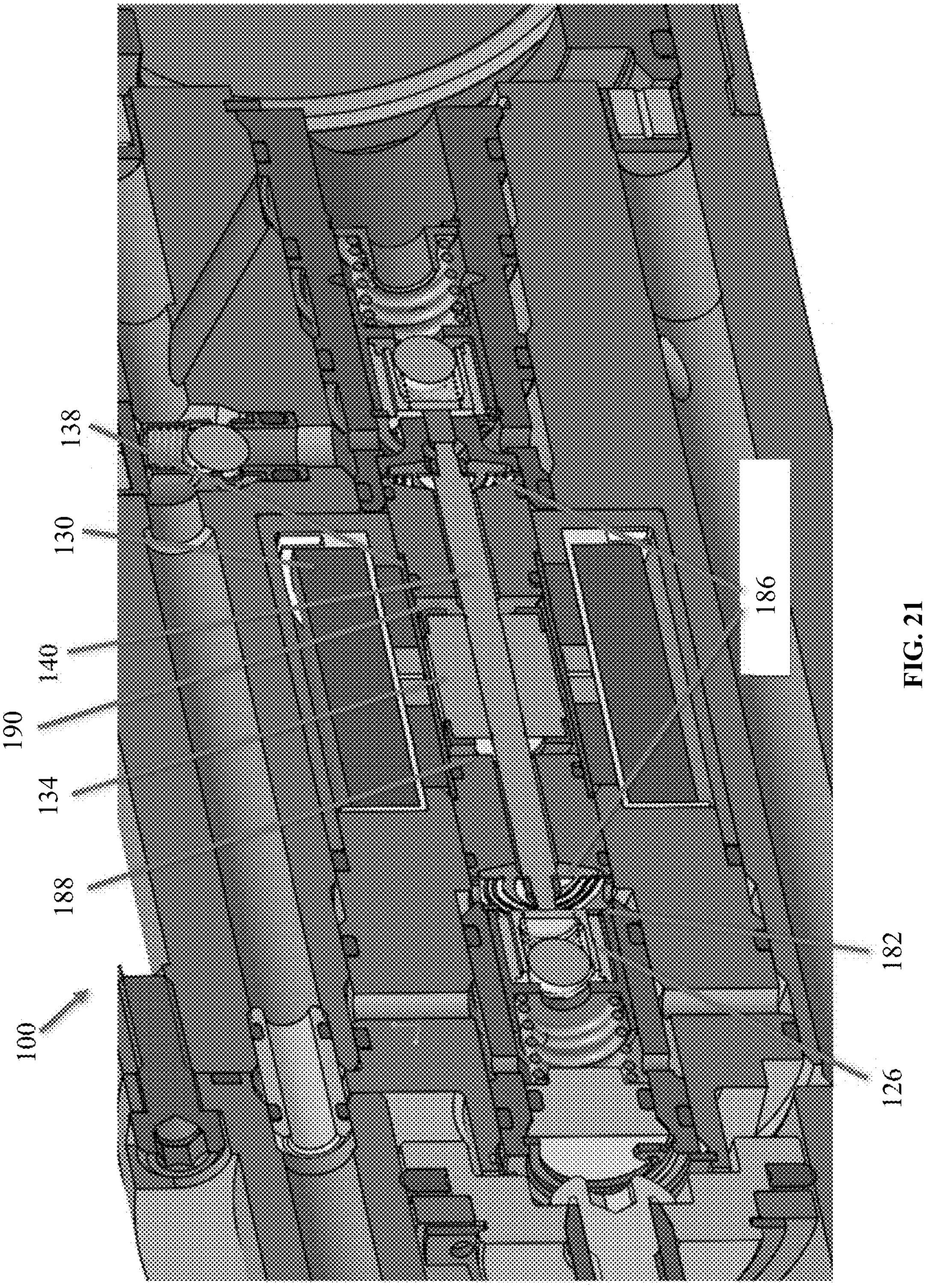

FIG. 21 presents a cross-sectional view of an exemplary device illustrating bearings suitable for use in practicing exemplary embodiments of this disclosure.

Figure 22:
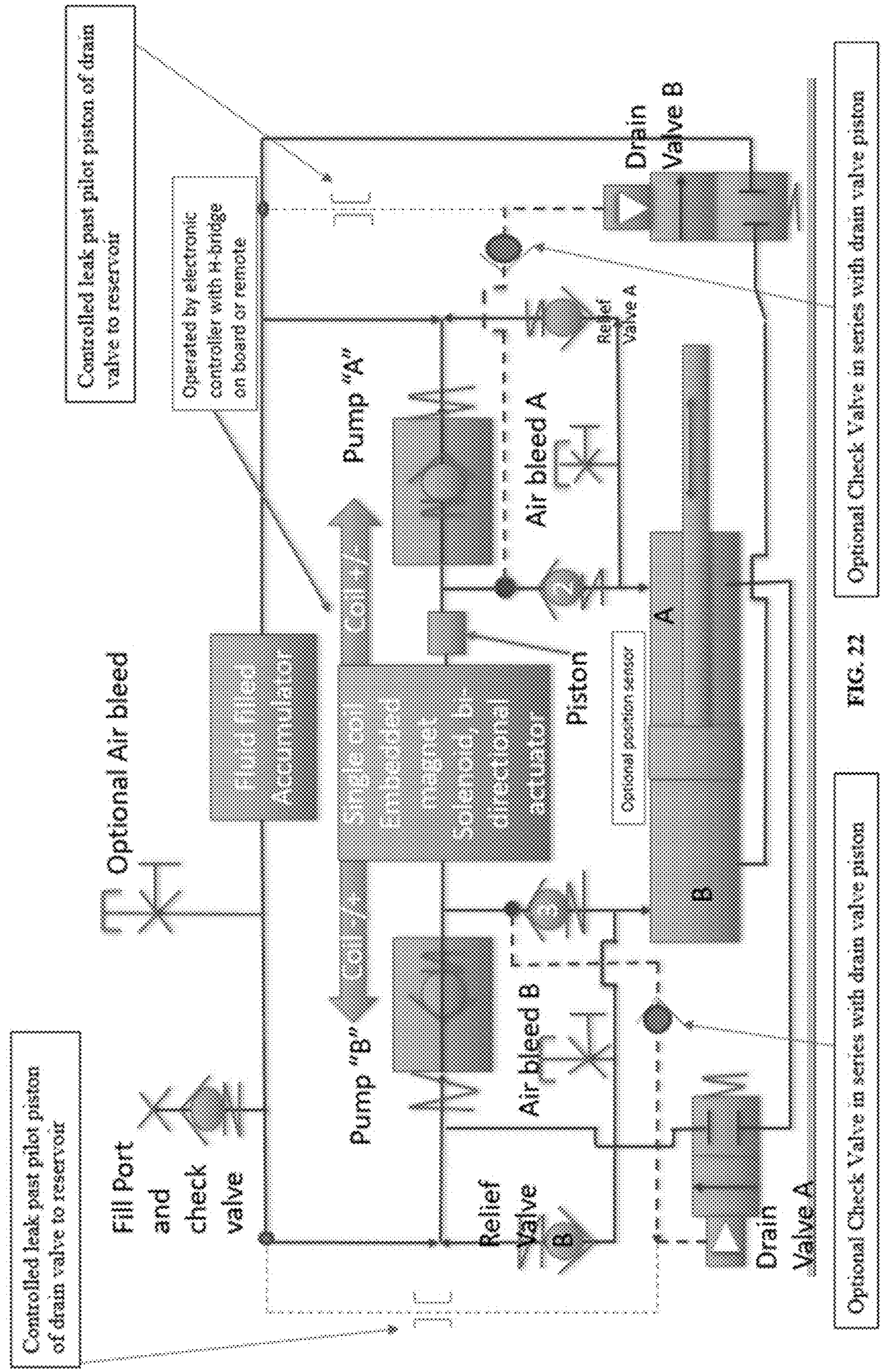

FIG. 22 presents a block diagram of yet another exemplary device suitable for use in practicing exemplary embodiments of this disclosure.

Figure 23:
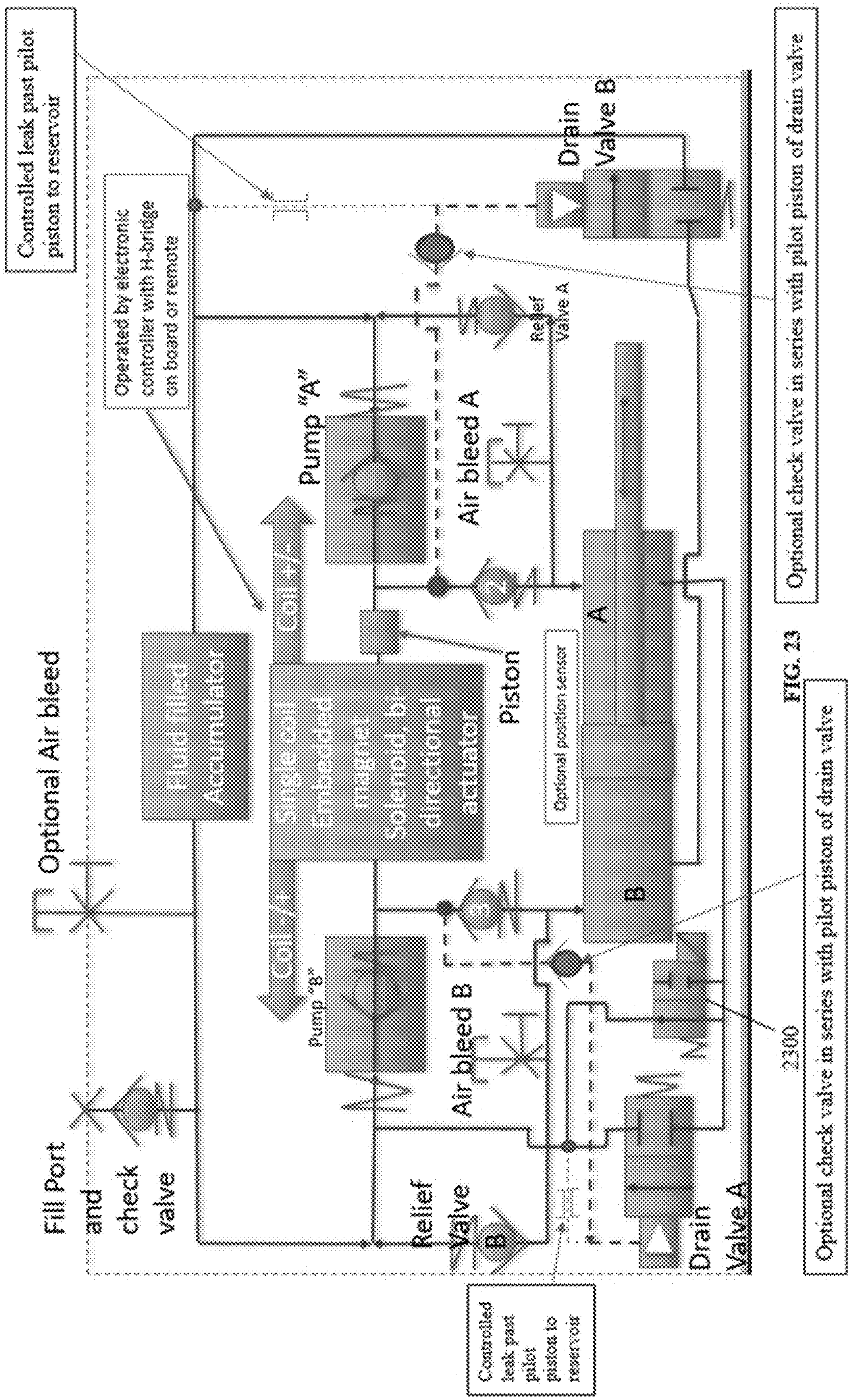

FIG. 23 presents a block diagram of a further exemplary device suitable for use in practicing exemplary embodiments of this disclosure.

Figure 24:
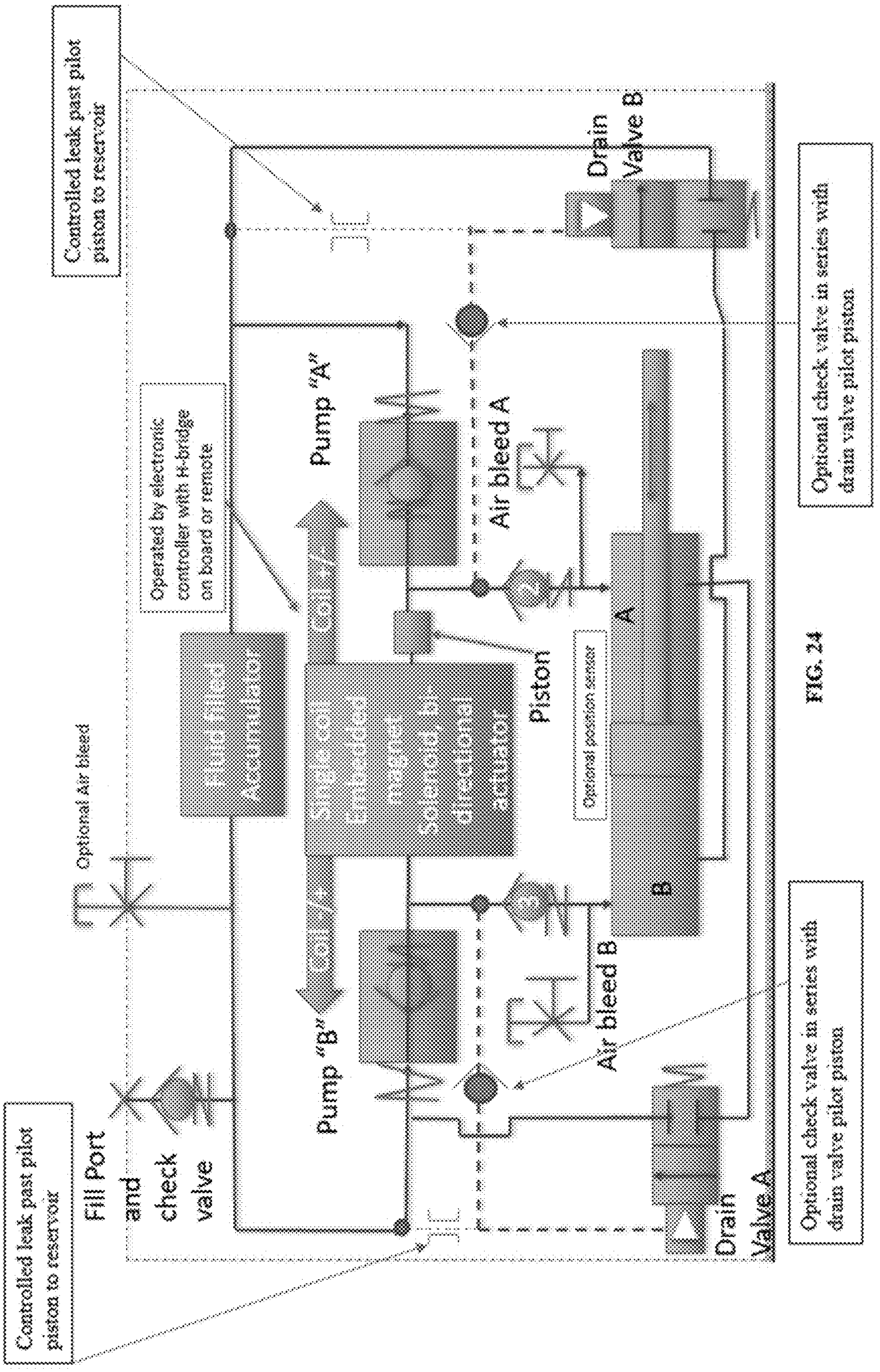

FIG. 24 presents a block diagram of a further alternative exemplary device suitable for use in practicing exemplary embodiments of this disclosure.

Figure 25:
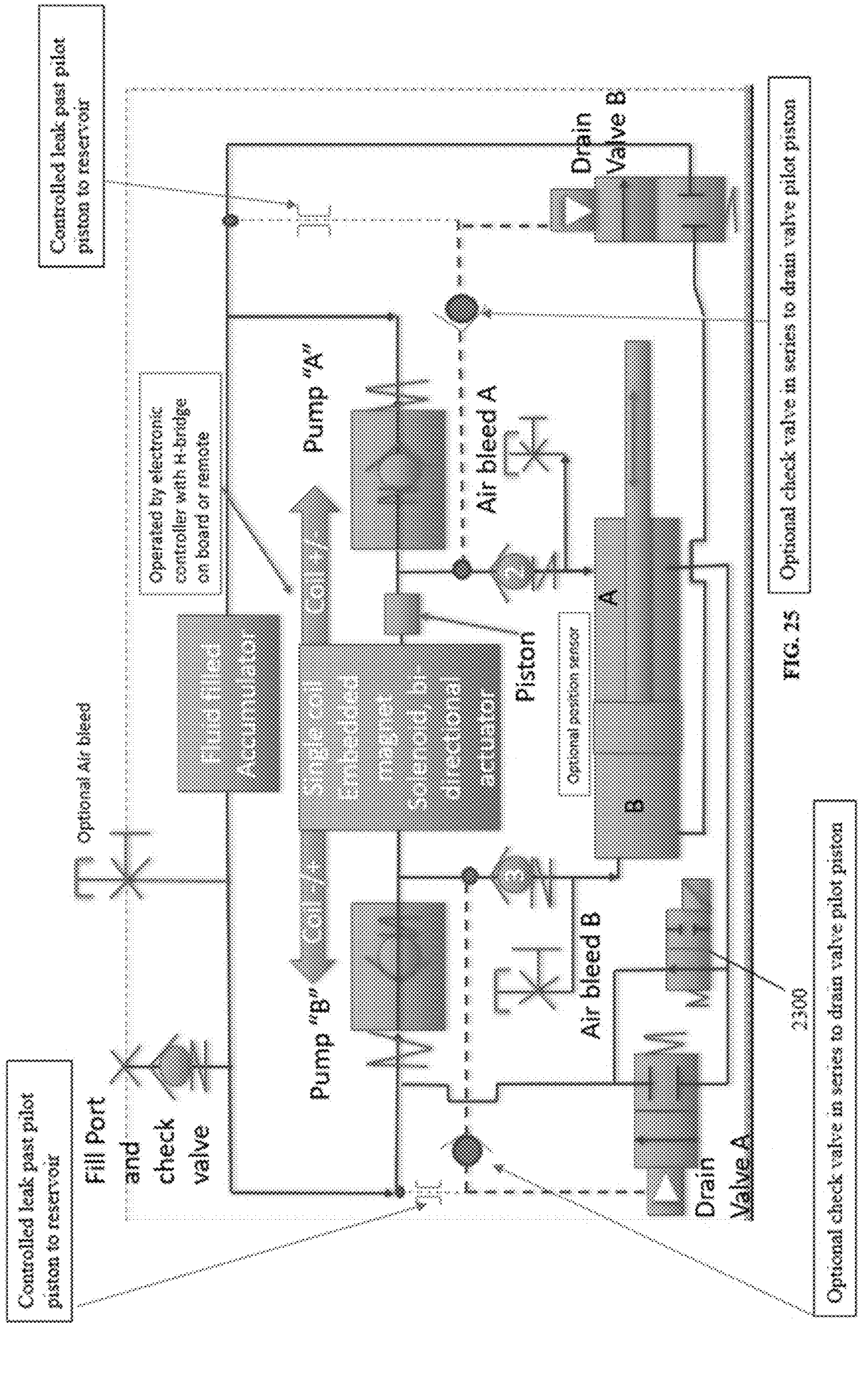

FIG. 25 presents a block diagram of yet a further alternative exemplary device suitable for use in practicing exemplary embodiments of this disclosure.

Figure 26:
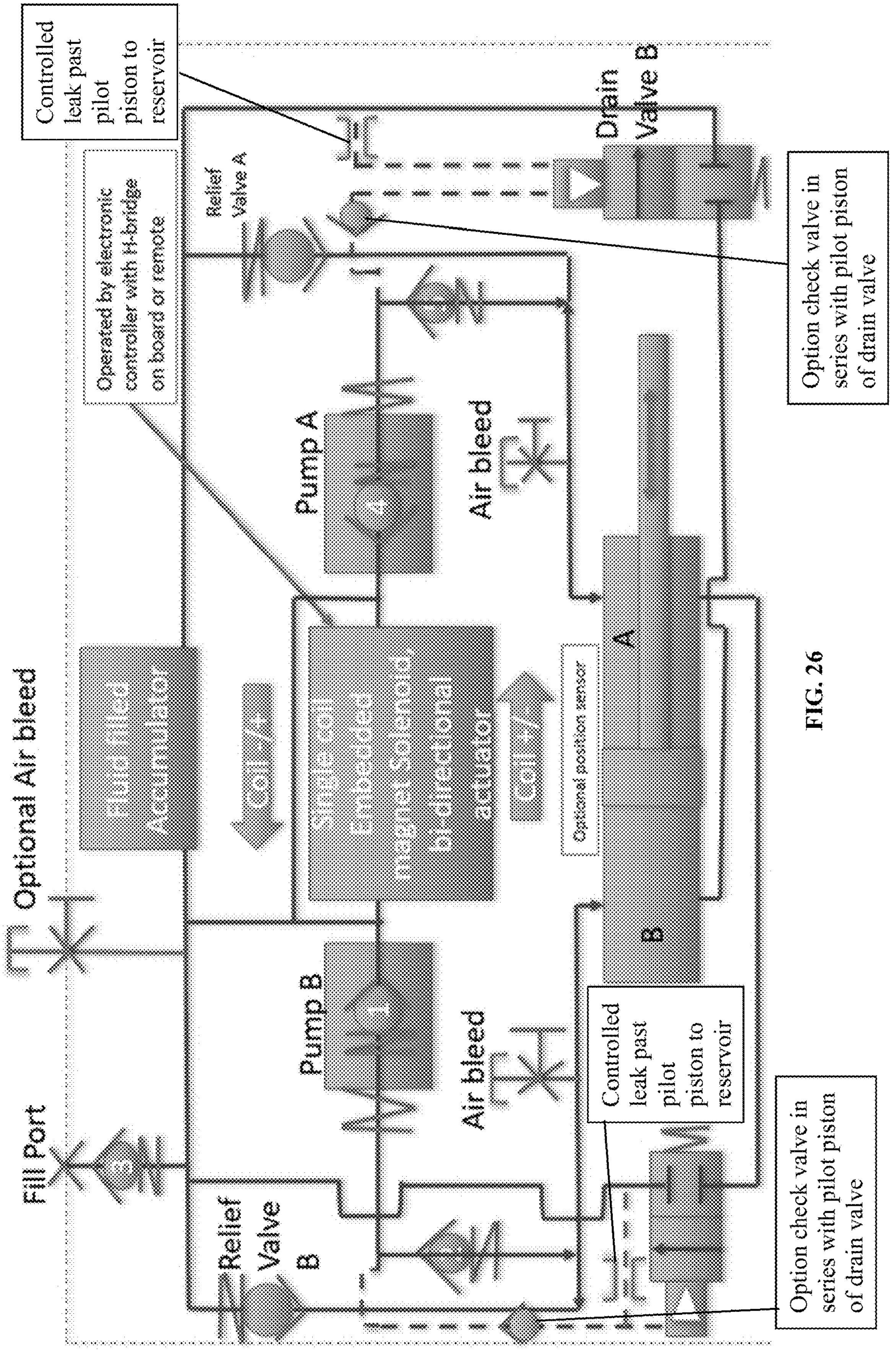

FIG. 26 presents a block diagram of an even further alternative exemplary device suitable for use in practicing exemplary embodiments of this disclosure.

Figure 27:
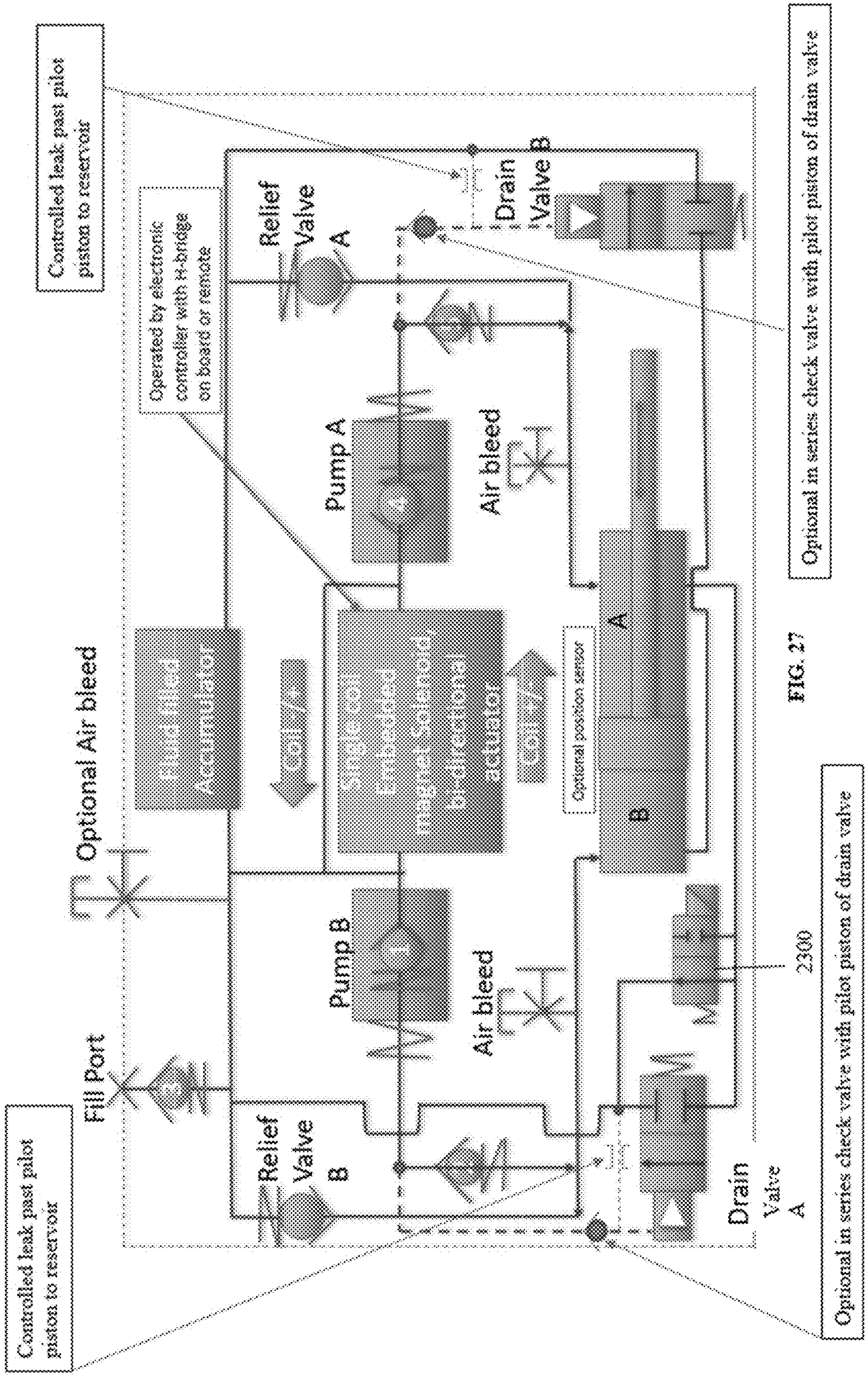

FIG. 27 presents a block diagram of another alternative exemplary device suitable for use in practicing exemplary embodiments of this disclosure.

Figure 28:
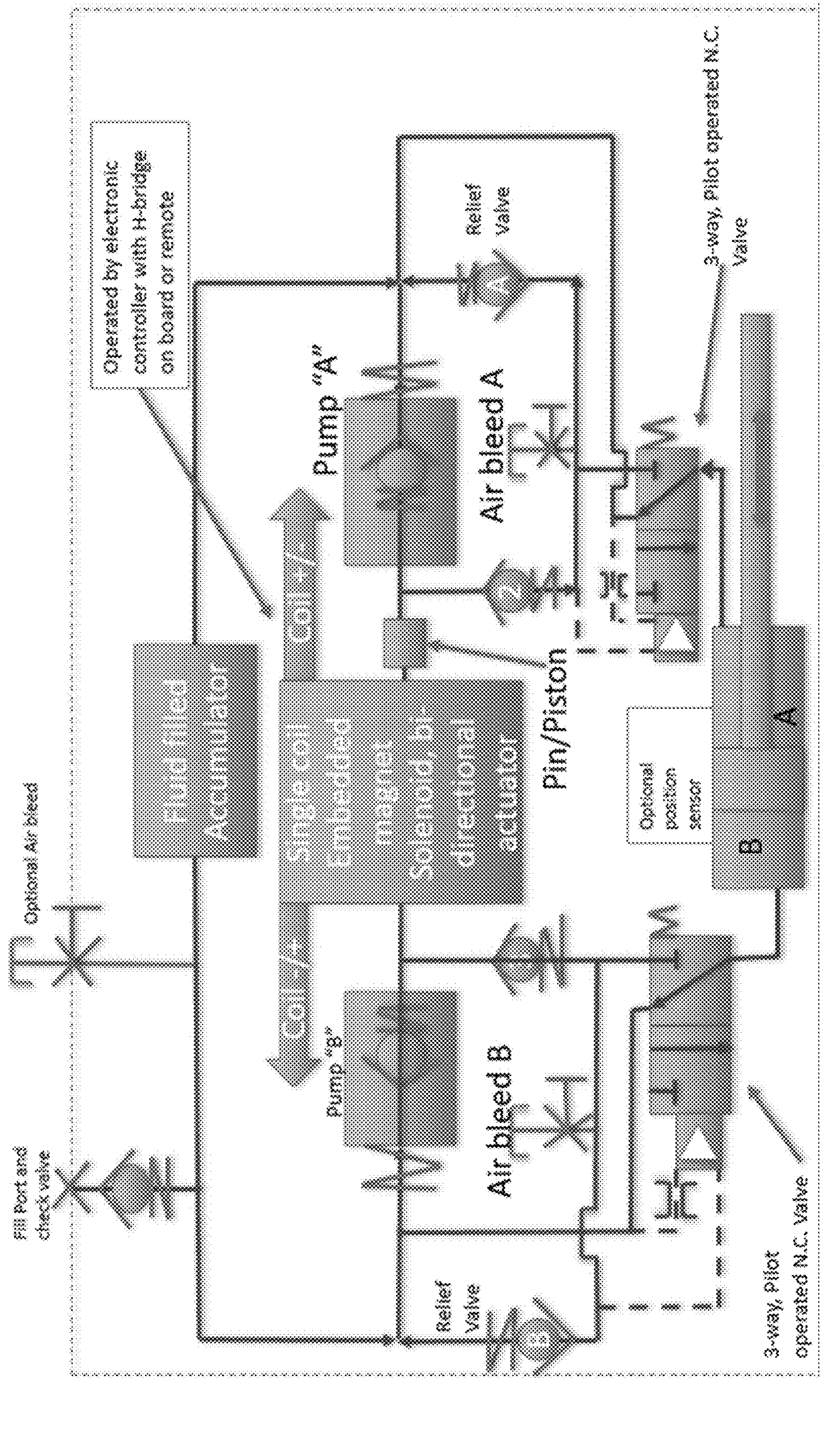

FIG. 28 presents a block diagram of yet another exemplary device suitable for use in practicing exemplary embodiments of this disclosure.

Figure 29:
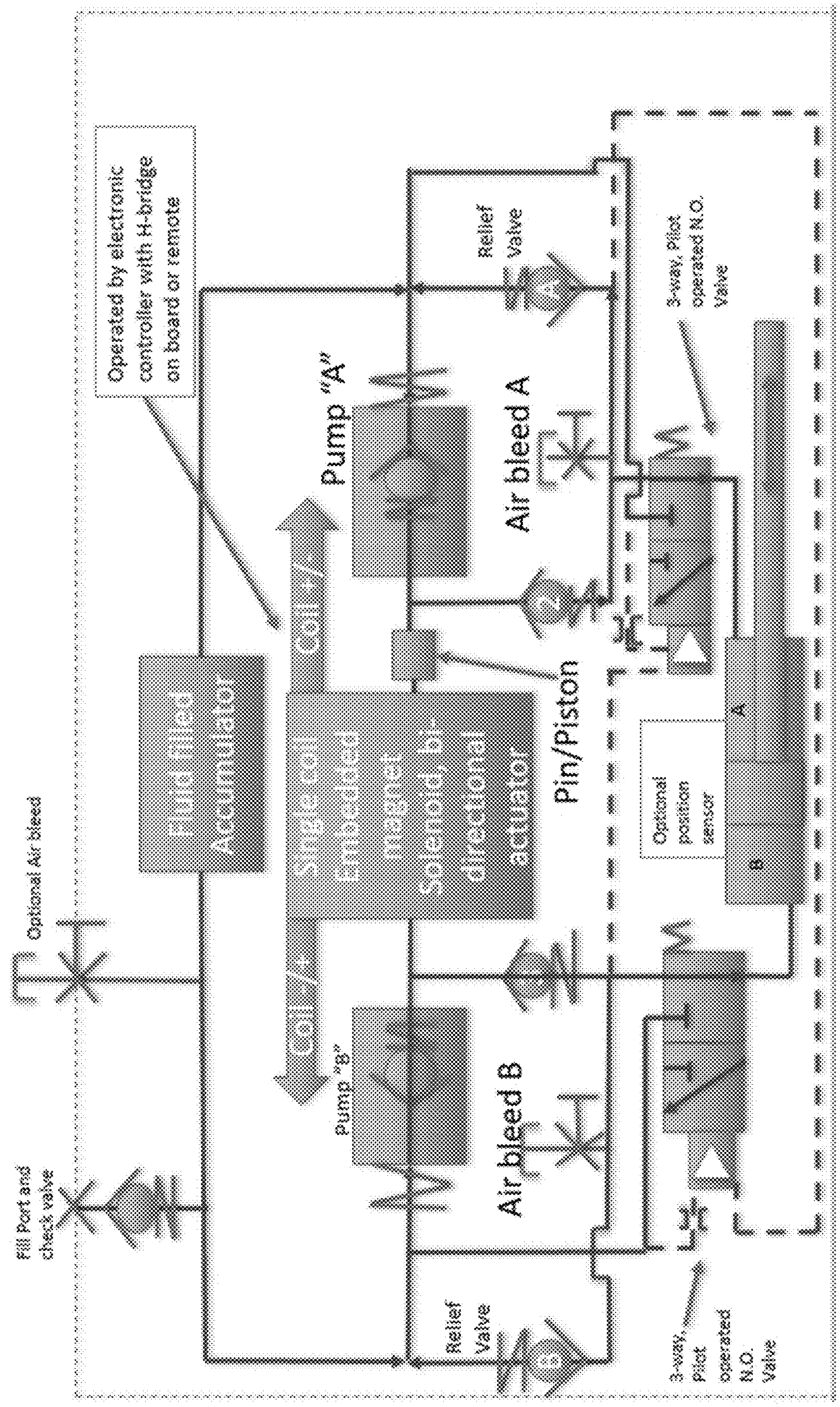

FIG. 29 presents another block diagram of an exemplary device suitable for use in practicing exemplary embodiments of this disclosure.

Figure 30:
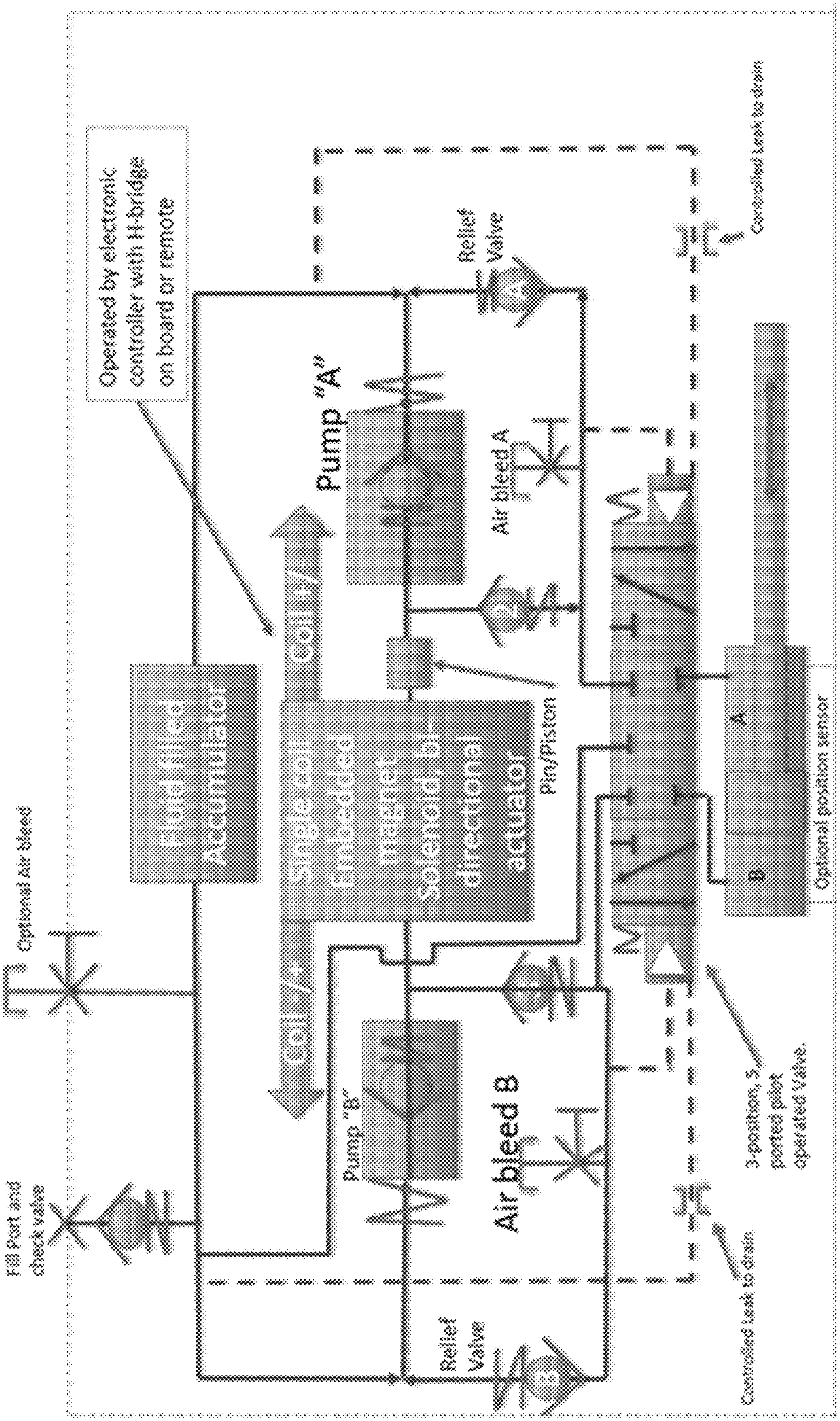

FIG. 30 presents yet another alternative block diagram of an exemplary device suitable for use in practicing exemplary embodiments of this disclosure.

Figure 31:
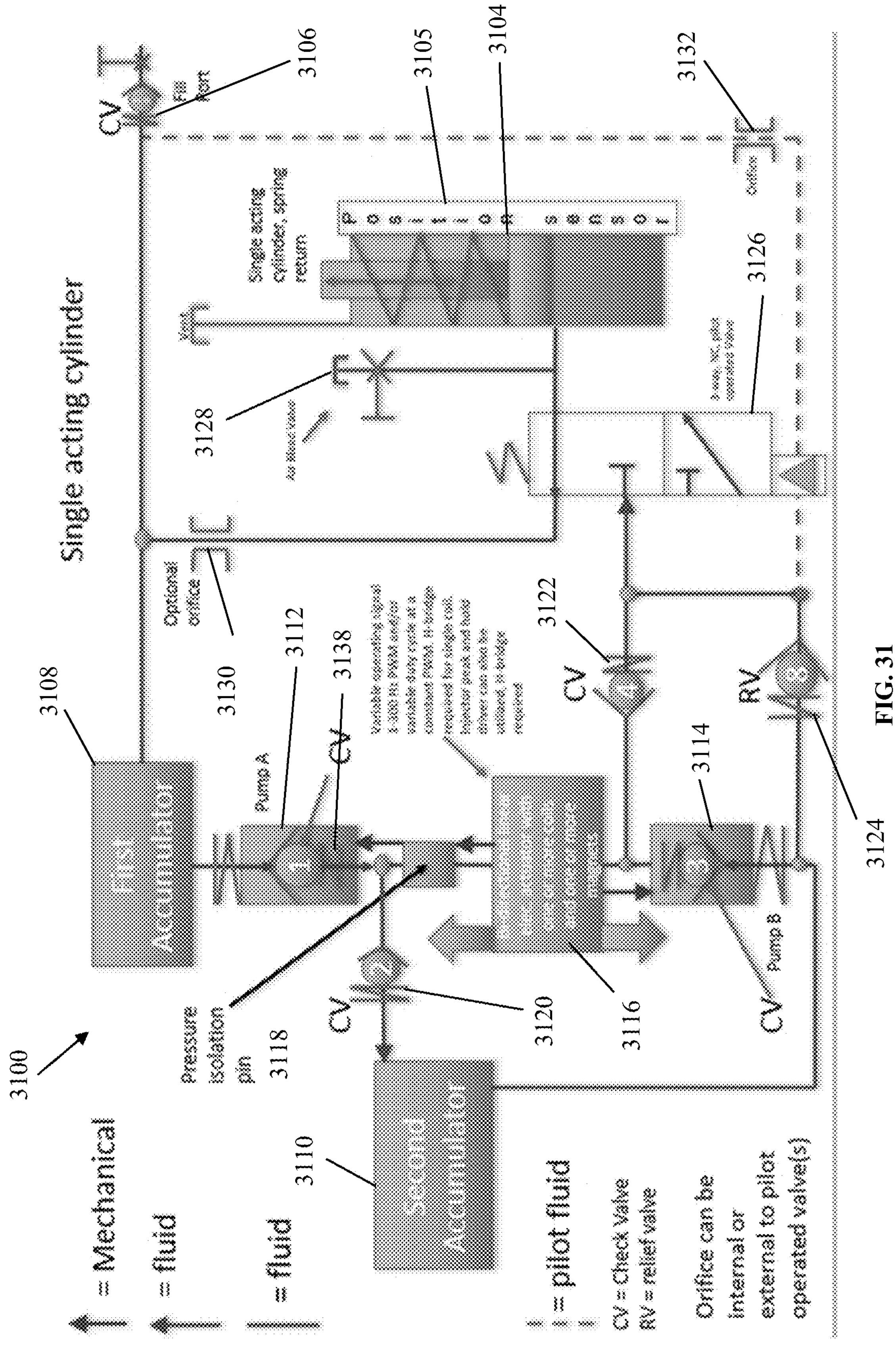

FIG. 31 presents a block diagram of an exemplary device having two accumulators suitable for use in practicing exemplary embodiments of this disclosure.

Figure 32:
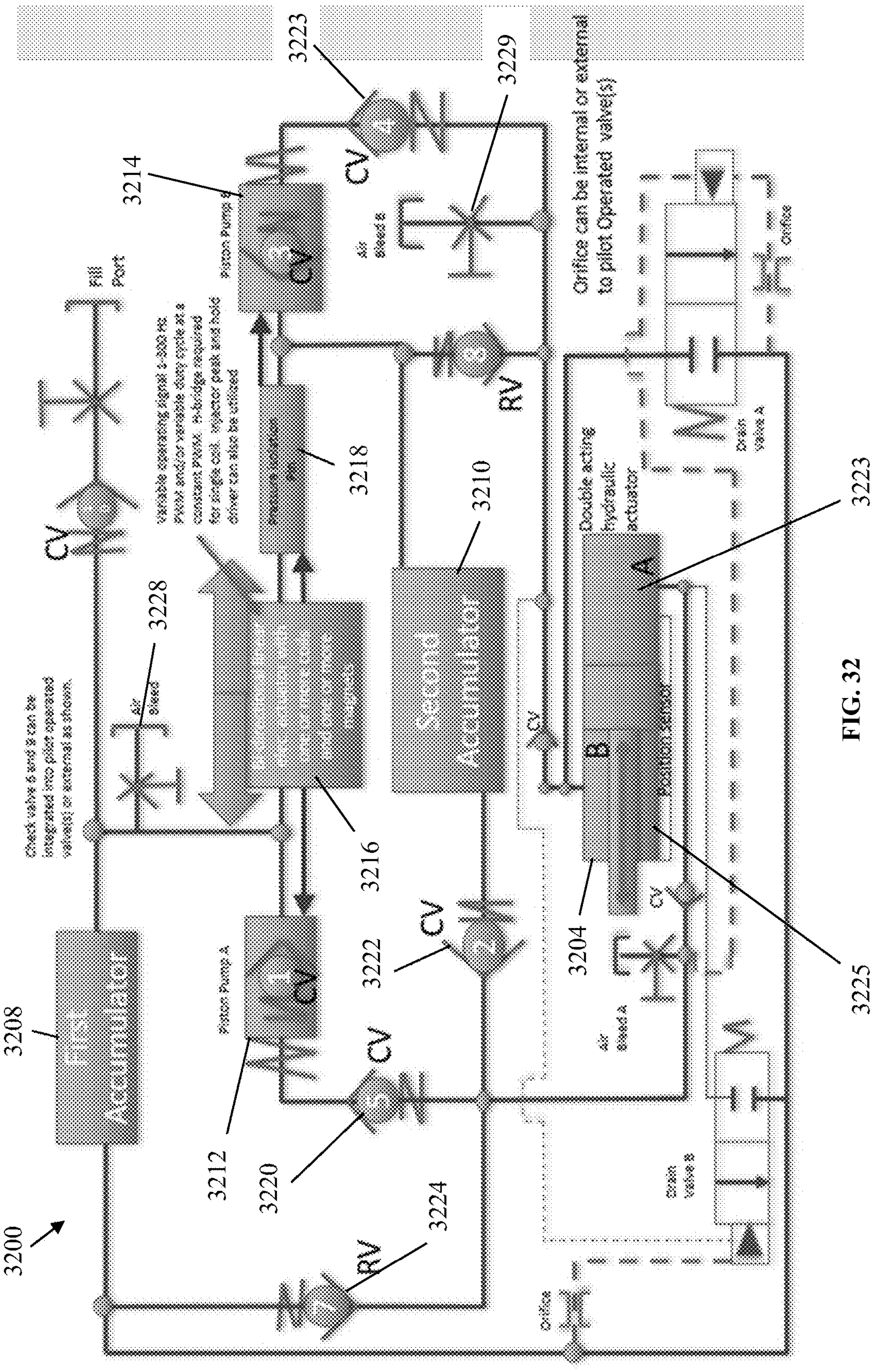

FIG. 32 presents another block diagram of an exemplary device having two accumulators suitable for use in practicing exemplary embodiments of this disclosure.

Figure 33:
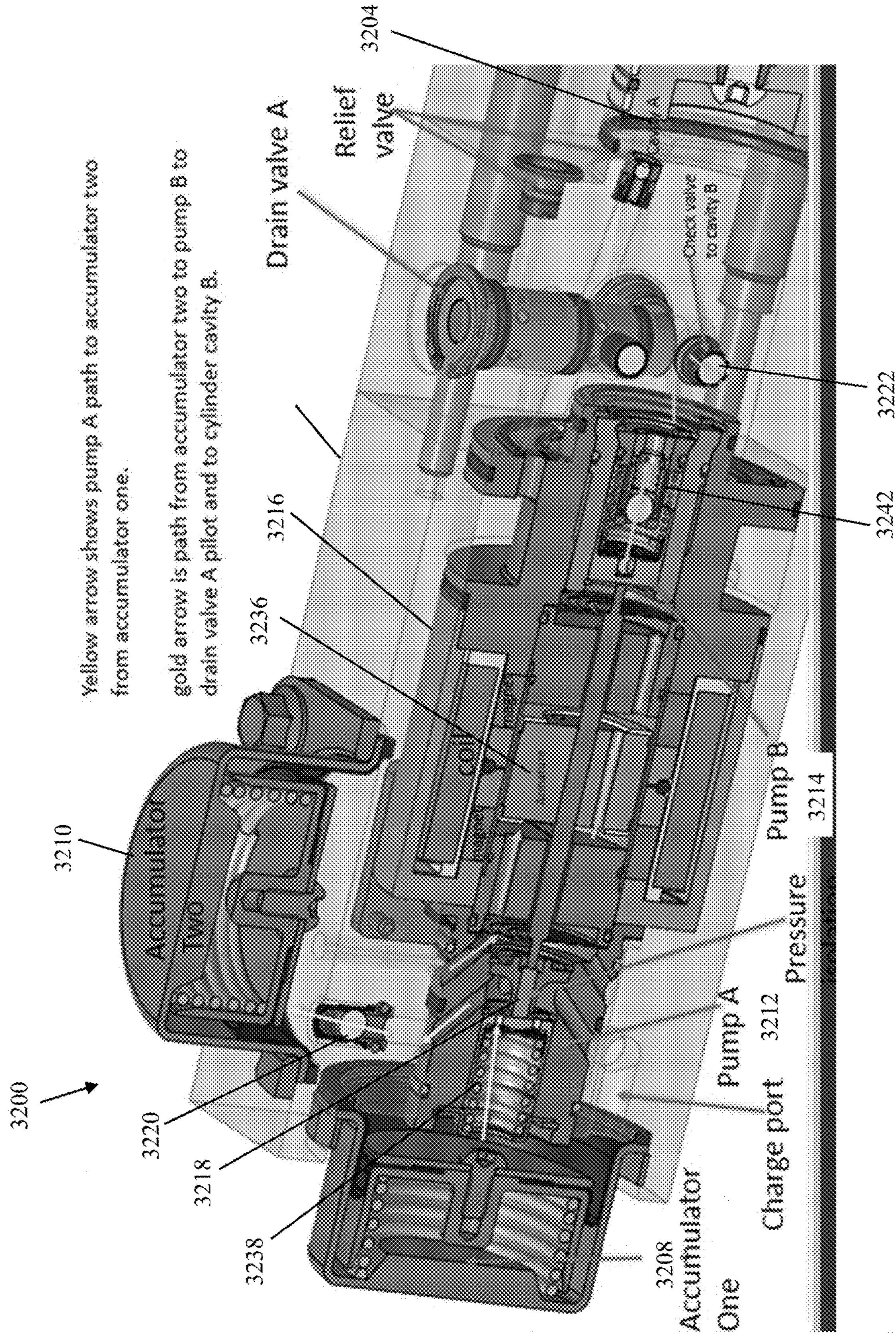

FIG. 33 presents a cross-sectional view of an exemplary device having two accumulators suitable for use in practicing exemplary embodiments of this disclosure.

Figure 34:
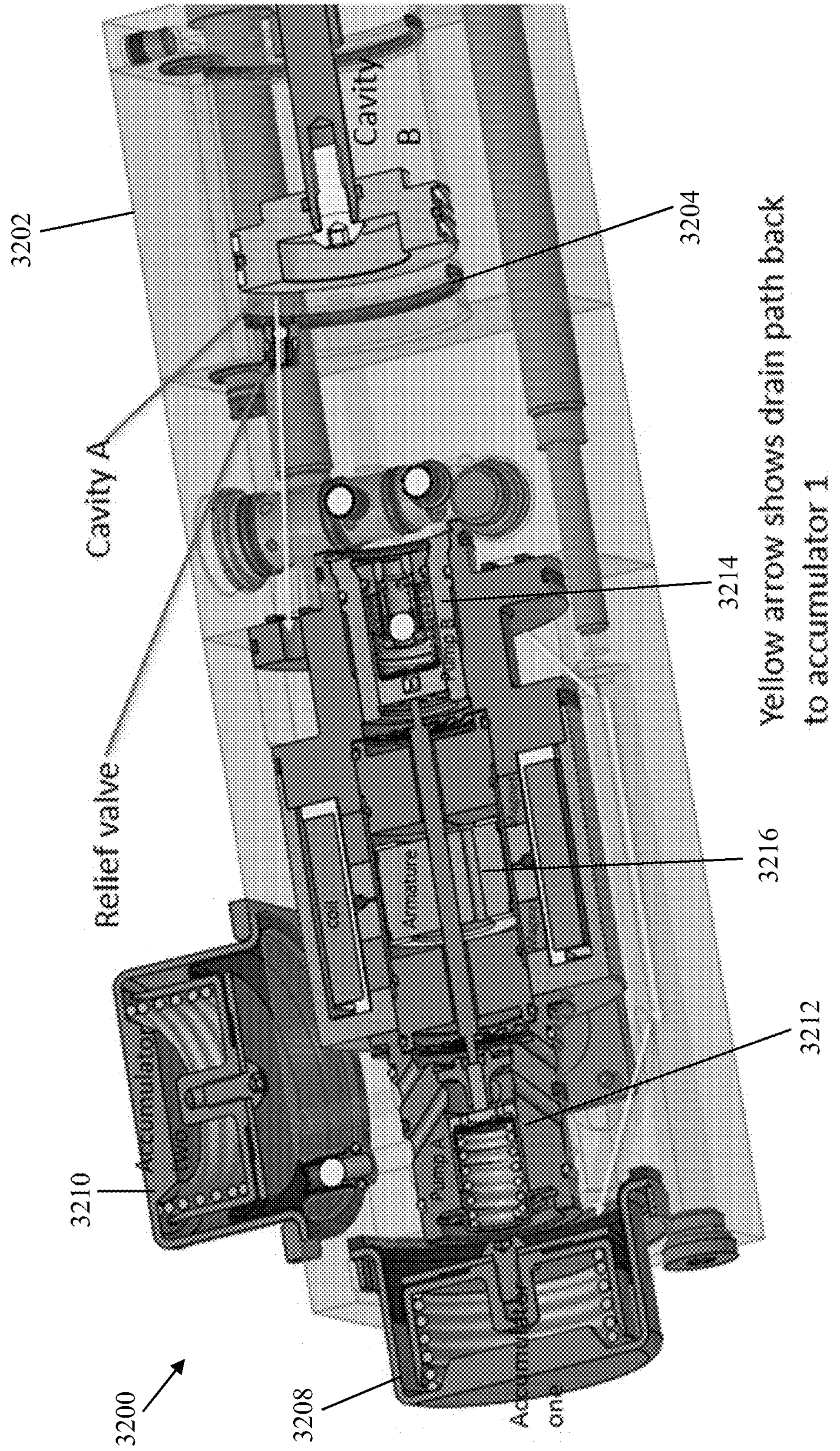

FIG. 34 presents a cross-sectional view of an exemplary device having two accumulators suitable for use in practicing exemplary embodiments of this disclosure.

Figure 35:
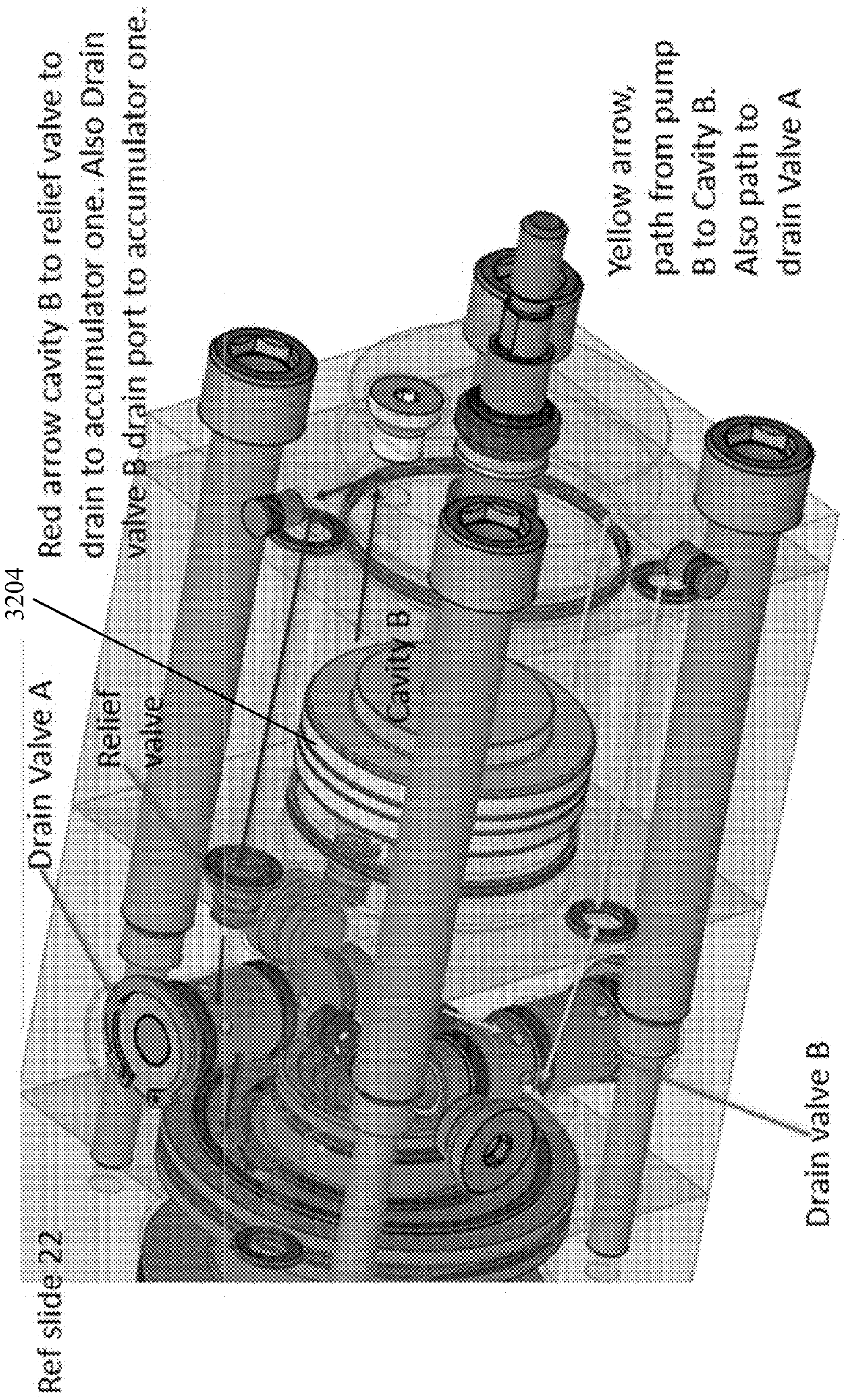

FIG. 35 presents a close-up view of a portion of an exemplary device having two accumulators suitable for use in practicing exemplary embodiments of this disclosure.

Figure 36:
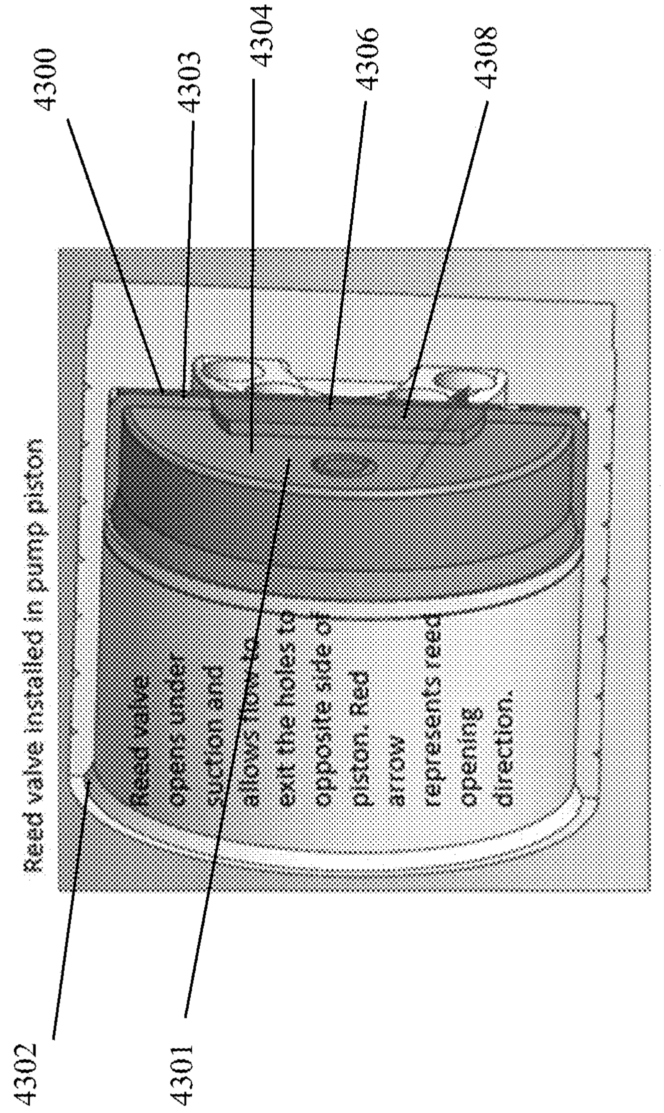

FIG. 36 presents a cross-sectional view of an exemplary reed valve suitable for use in practicing exemplary embodiments of this disclosure.

Figure 37:
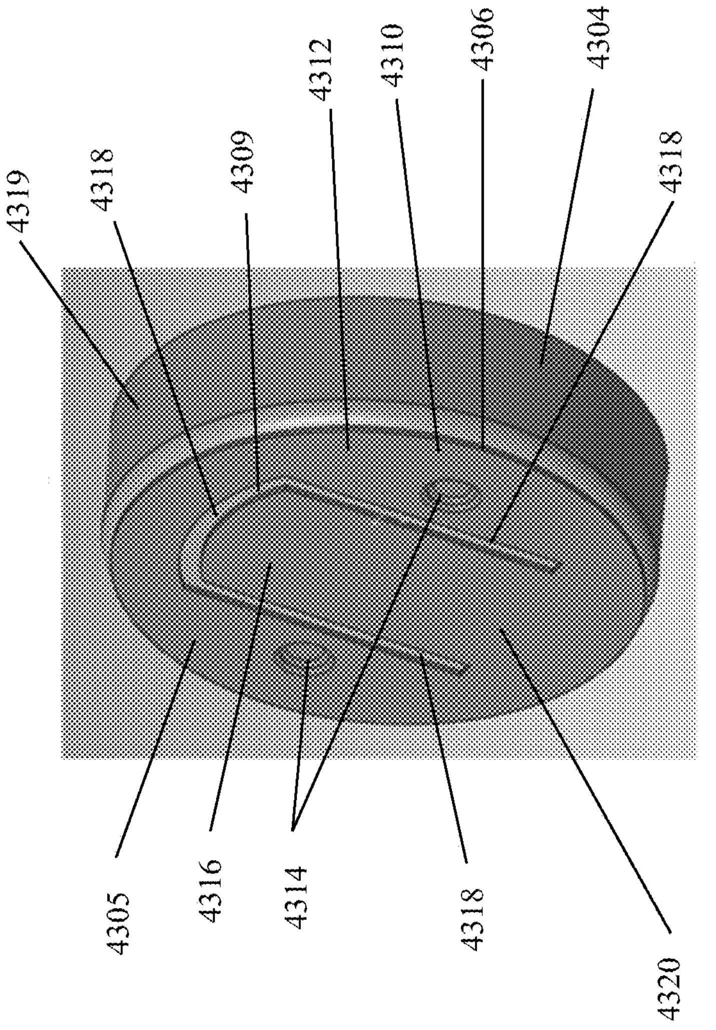

FIG. 37 presents a side perspective view of an exemplary reed valve suitable for use in practicing exemplary embodiments of this disclosure.

Figure 38:
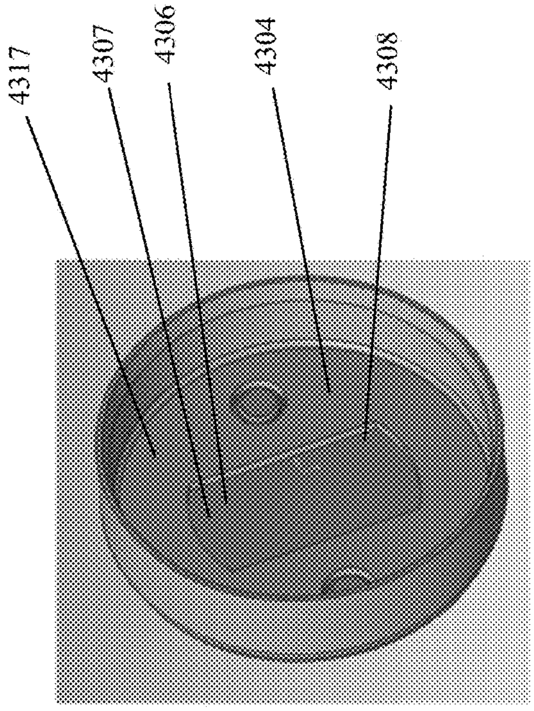

FIG. 38 presents a front view of another exemplary reed valve suitable for use in practicing exemplary embodiments of this disclosure.

Figure 39:
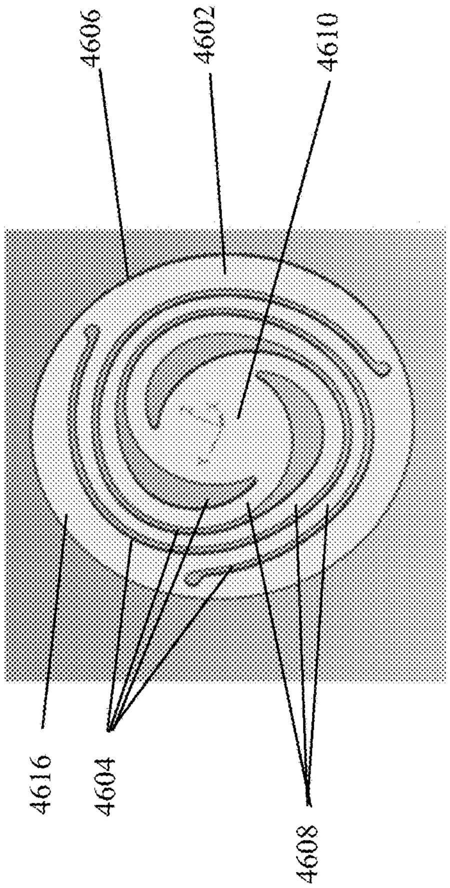

FIG. 39 presents an interior view of an exemplary reed valve suitable for use in practicing exemplary embodiments of this disclosure.

Figure 40:
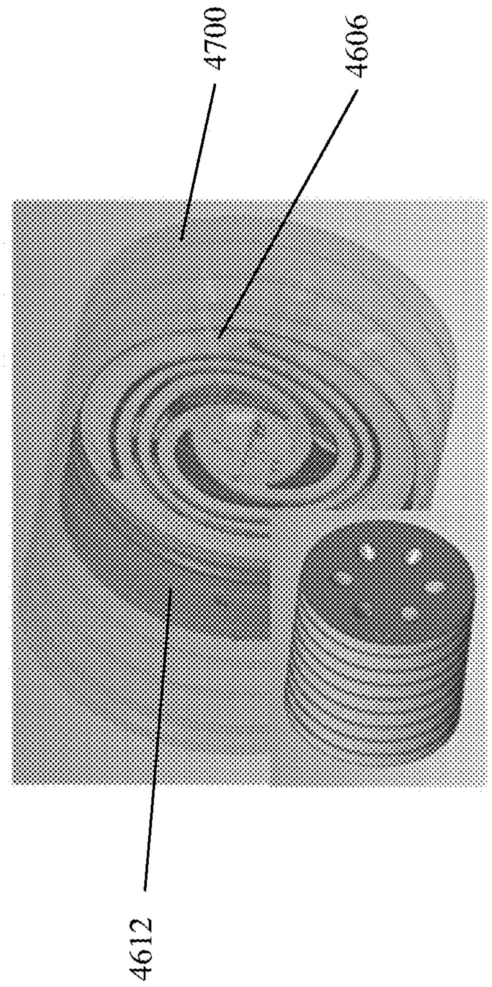

FIG. 40 presents a cross-sectional view of an exemplary reed valve suitable for use in practicing exemplary embodiments of this disclosure.

Figure 41:
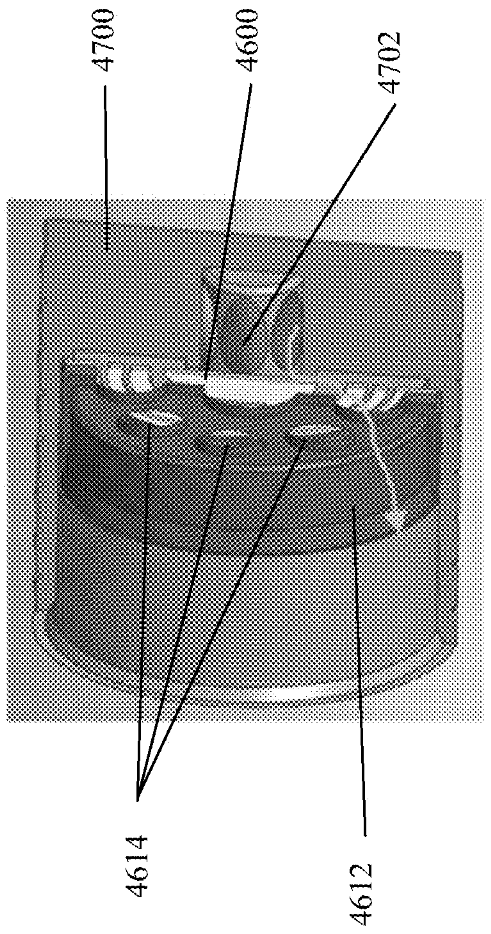

FIG. 41 presents a number of alternative embodiments of exemplary reed valve configurations suitable for use in practicing exemplary embodiments of this disclosure.

DETAILED DESCRIPTION OF THE INVENTION

Traditional electro-hydrostatic actuator systems are large in size. They have less stiffness and lower force output in comparison to their overall size. As such, there is a need for an electro-hydrostatic actuator that is smaller in size and can be operated under low electrical power levels to produce high actuation forces.

Embodiments of the present disclosure provide an electro-hydrostatic actuator assembly having a single acting cylinder with a spring return. Embodiments include an electro-hydrostatic actuator assembly having an accumulator and hydraulic actuation that is self-contained within a single assembly. Embodiments include an electro-hydrostatic actuator assembly having a solenoid with an embedded magnet design that is operable to pulse to pump oil from the accumulator into the cylinder through a set of pistons and check valves. Embodiments provide the embedded magnet actuator of the electro-hydrostatic actuator assembly can pulse in a first direction to allow for incremental stroke changes of the actuator that are proportional to the magnetic flux created by the embedded magnet actuator. Embodiments provide that the embedded magnet actuator can be energized in a second direction to actuate the drain valve thereby draining the cylinder. The electro-hydrostatic actuator assembly includes a spring in the cylinder operable to force or push oil back to the low-pressure accumulator. In some embodiments, the electro-hydrostatic actuator assembly includes a position sensor that can provide feedback position data of the cylinder to a controller. Embodiments of the electro-hydrostatic actuator assembly uses silicone oil to substantially maintain the viscosity as constant as possible over a wide temperature range in the actuator assembly. Embodiments include using other types of oils that allow the system to operate as set forth below throughout a wide temperature range. Embodiments provide an electro-hydrostatic actuator that consumes a low amount of power when the actuator is in a static position. Embodiments provide an electro-hydrostatic actuator that is turned off or does not consume power when it is not causing or pumping a fluid to flow within the system.

Referring to FIG. 1, shown is electro-hydrostatic assembly 100 having a cylinder body 102, a single acting cylinder 104, a fill port 106, and a bleed screw 108. Cylinder body 102 includes a longitudinal axis 110. In one embodiment, the cylinder body 102 is approximately 2.625-inch dia by 8.42 inches long. It should be appreciated that embodiments of cylinder body 102 range from 1.5 inch dia by 5 inches long to 4.0 inches dia by 15 inches long.

Reference is now made to FIGS. 2-4, which depict cross-sectional views of electro-hydrostatic assembly 100. Shown in FIGS. 2-4 are electro-hydrostatic assembly 100 having a cylinder body 102. Within cylinder body 102 is a single acting cylinder 104 and a fill port 106. Cylinder body 102 has a longitudinal axis as indicated by line 110. Electro-hydrostatic assembly 100 also includes an accumulator 112, a check valve 120*a*, an embedded magnet actuator 116, a drain valve 118 comprising a spool 122 with a cavity 124 in series with check valve 120*b*, a pump piston 126, and drain path 128 from drain valve 118 to accumulator reservoir 150.

Embedded magnet actuator 116 includes a coil 130 (shown in FIGS. 2, 3 and 6) that circumscribes and is radially outward from magnets 132 and armature 134 (shown in FIG. 3). It should be appreciated that embodiments of embedded magnet actuator 116 includes at least one magnet 132 and can include multiple magnets 132 provided it causes embedded magnet actuator 116 to operate as described herein. Coil 130 is operable to have a current passed through it to create a magnetic flux. In some embodiments, coil 130 is made of copper or aluminum insulated magnet wire. Armature 134 is located within cavity 136 (shown in FIG. 3) and is operable to move through the longitudinal axis 110 of cavity 136. It should be appreciated that embodiments of embedded magnet actuator 116 can include one or more coils 130. The magnetic flux created by current passing through coil 130 causes armature 134 to move through the longitudinal axis 110 of cavity 136. The direction of movement of armature 134 is determined by the relationship with the pole faces, the orientation of magnets 132, and the polarity of the current applied to coil 130. Armature 134 and cavity 136 are maintained within a core tube 138 (shown in FIG. 6).

Radially outward from the core tube 138 are spaced apart magnets 132. Spaced apart magnets 132 circumscribe the core tube 138 and may each include two or more separate (e.g., C-shaped or curved) magnets. Magnets 132 are separated or spaced from one another in the longitudinal direction by a ferromagnetic spacer 133 (shown in FIGS. 3 and 6) that circumscribes the core tube 138. It should be appreciated that embodiments of ferromagnetic spacer 133 can include two or more separate spacers (e.g., curved spacers) that collectively circumscribe the core tube 138. Magnets 132 are positioned such that like poles face one another.

Armature 134 includes or is affixed to rod 140. Rod 140 extends through the longitudinal axis 110 and is operable to move in the longitudinal direction with armature 134 in response to changes in magnetic flux caused by current passing through coil 130 in a first polarity direction and a second polarity direction. Rod 140 is operable to move through the longitudinal direction within core tube 138 along flexible bearings 186 (shown in FIG. 21) located on the longitudinal exterior face of pole stops 188, 190. Rod 140 is operable to put pressure on, compress and move piston 126 from a first neutral position to a second compressed position. This movement creates a suction force within piston 126 causing the check valve 120*c* to open allowing fluid to flow from the accumulator reservoir 150 into the pumping cavity when rod 140 and armature 134 is moved towards the accumulator 112. Upon removal of magnetic flux, the armature 134, rod 140, and piston 126 move away from the accumulator 112 towards their neutral position or centered position within core tube 138 located radially inward from magnets 132. The check valve 120*c* will close and the force created by spring 142 (shown in FIG. 3) pushes the piston 126 with the check valve 120*c* in a closed position forcing fluid at a pressure equal to the force created by spring 142 divided by the area of the piston 126 through a second series of check valves 120*d* into the actuator cavity 146*c*.

Rod 140 is also operable to put pressure on and move check valve 120*b* followed by spool 122 from the closed or neutral position obstructing a flow of fluid to the open position allowing the flow of fluid from the cylinder cavity 146*c* back to the accumulator reservoir 150. This occurs when rod 140 and armature 134 is moved towards single acting cylinder 104 in response to a second polarity (e.g., a polarity that is opposite the first polarity) signal applied to coil 130. Upon removal of the magnetic field from coil 130, rod 140, armature 134, and piston 122 move away from the actuator 104 by spring 144 back to their neutral positions obstructing fluid from the actuator cavity 146*c* to accumulator reservoir 150. Check valve 120*b* then closes blocking fluid from exiting actuator cavity 146*c*. It should be appreciated the embodiments include embedded magnet actuator 116 being replaced by any type of bi-directional electrical actuator that is operable to compress or activate two piston pumps independently as described herein. Embodiments of bi-directional electrical actuator include voice coil actuators, moving magnet actuators, and one or more motors operable actuate lateral movement of a rod that can independently compress or activate two piston pumps or via a cam to independently compress or activate the two piston pumps.

Accumulator 112 is fluidly connected to single acting cylinder 104 within cylinder body 102 through a series of passageways 146 which can include a plurality of check valves 120, a pump and control valve. Embodiments of accumulator 112, passageways 146, single acting cylinder 104, and embedded magnet actuator 116 allow fluid (e.g., oil) to communicate or flow to accumulator 112 from single acting cylinder 104 and to single acting cylinder 104 from accumulator 112 in response to movement of armature 134 and the magnetic flux created by current passing through coil 130 when activated with a first and second polarity direction.

Cylinder body 102 includes a fill port 106, which is fluidly connected to passageways 146. Fill port 106 provides an opening into passageways 146 such that fluid and/or oil can be provided into passageways 146. Fill port 106 is fluidly connected to passageway 146*a* which is fluidly connected to check valve 120*a*. Check valve 120*a* is fluidly connected to pump reservoir 150. Check valve 120*a* is operable to allow the flow of fluid from passageway 146*a* to pump reservoir 150 and passageways 146 throughout the assembly 100 until the fluid pressure from the side of the fill port 106 reaches a predetermined threshold. Upon removal of fluid pressure at the fill port 106, the check valve 120*a* will prevent fluid to pass from cylinder passages 146 and pump reservoir 150 into passageway 146*a*. Pump reservoir 150 is fluidly connected to check valve 120*c*.

Check valve 120*c* is fluidly connected to pump reservoir 150 and passageway 146*b* (shown in FIG. 3). Check valve 120*c* is operable to prevent the flow of fluid from pump reservoir 150 to passageway 146*b* until the fluid pressure from the pump reservoir 150 reaches a predetermined threshold, which is created by lowering the pressure in cavity 146*b* when the pump 126 is activated by compressing spring 142 with the embedded magnet actuator rod 140 causing a high differential pressure across check valve 120*c*. Passageway 146*b* is fluidly connected to check valve 120*d*. Check valve 120*d* is fluidly connected to passageway 146*c*, check valve 120*b*, and drain valve 118. Passageway 146*c* is fluidly connected to relief valve 154, which is fluidly connected to pump reservoir 150.

Passageways 146*b* and 146*c* each include a bleed screw 108. Bleed Screws 108 are operable to allow a temporary opening between passageways 146*b*, 146*c* and the surrounding environment such that air can be removed from passageways 146*b*, 146*c*.

Drain valve 118 and check valve 120*b* is adjacent one distal end of rod 140. Piston 126 with check valve 120*c* is adjacent to the distal end of rod 140 that is opposite the drain valve 118. It should be appreciated that embodiments of drain valve 118 include an electrically operated solenoid drain valve in which current can be passed through a coil in the solenoid causing an armature in the solenoid to move and either open or close the drain valve. Embodiments provide that movement of armature 134 and rod 140 in response to current passing through coil 130 activated in a first polarity direction will cause rod 140 to come into contact with piston 126 causing piston 126 with check valve 120*c* to move in the longitudinal direction towards accumulator 112 until armature 134 hits the pole stop 188 (shown in FIG. 21). During this movement, fluid will be allowed to flow from pump reservoir 150 to passageway 146*b* between check valve 120*c* and 120*d*. The amount of fluid from the reservoir that is allowed to flow will be equivalent to the increase in volume created during the movement of piston 126. The check valve 120*c* will close when the volume of fluid displaced is equal to the volume of movement of piston 126. When current is removed from coil 130, the piston 126, rod 140, and armature 134 will be pushed back towards their neutral positions by spring 142 until piston 126 stops on retainer 182 (shown in FIG. 21), which provides a lip or physical stop for piston 126. The motion of the armature 134 when current is removed from coil 130 creates fluid pressure that opens check valve 120*d* and opens a connection into actuator cavity 146*c*. The amount of fluid moved is equal to the amount of fluid displaced by piston 126 and check valve 120*c* when the armature 134 moves away from the accumulator along the longitudinal axis 110 until the piston 126 contacts the retainer 182 and movement is stopped. The pressure from the fluid will then act upon single acting cylinder 104 and will cause single acting cylinder 104 to move in the longitudinal direction against spring 160. The amount of movement of single acting cylinder 104 is based on the amount of fluid displaced per cycle of pump piston 126 and closed check valve 120*c* during the deactivation cycle of coil 130.

Embodiments provide that movement of armature 134 and rod 140 in response to current passing through coil 130 in a second polarity direction will cause rod 140 to come into contact with check valve 120*b* and drain valve 118 and will cause check valve 120*b* and drain valve 118 to move in the longitudinal direction to the open position. In the open position, fluid built up from accumulator 112 acting against single acting cylinder 104 will be allowed to flow through drain valve 118 from passageway 146*c* through passageway 146*f* toward accumulator reservoir 150. Relief valve 154 is fluidly connected to passageway 146*c* and pump reservoir 150. Relief valve 154 is operable to allow a flow of fluid from passageway 146*c* to pump reservoir 150 when the pressure from the fluid within passageway 146*c* reaches a predetermined threshold at which point relief valve 154 will allow a flow of fluid until the pressure within passageway 146*c* reaches a certain threshold.

Embodiments of device 100 further include an optional position sensor 160 (shown in FIG. 4). Position sensor 160 is operably connected to single acting cylinder 104 and is able to sense a relative location of single acting cylinder 104 in the longitudinal direction. As depicted in FIG. 4, embedded magnet actuator 116 is operated by a controller 162 that is operable to cause a current to pass through coil 130, which will cause armature 134 to move in the longitudinal direction. Embodiments of controller 162 include an electronic controller with an H-bridge that can be built into the controller or can be a separate and remote from the controller. As shown in FIG. 4, the current that passes through coil 130 will cause the polarity of the coil 130 to change to and from −/+ (causing the armature 134 with rod 140 to move in the longitudinal direction toward the accumulator 112) to +/− (causing the armature 134 with rod 140 to move in the longitudinal direction toward the drain valve 118). It should be noted that the polarity that is applied to coil 130 to cause directional motion of armature 134 is dependent on the orientation of the magnets 132 with respect to one another as installed in core tube 138 as well as the direction of the winding of coil 130. Device 100 also includes vents or ports that are operable to move between an open position and a closed position and are fluidly connected to passageways 146 to allow air to be removed from passageways 146.

Reference is now made to FIG. 5, which illustrates a perspective view of device 100. In FIG. 5, the exterior wall of device 100 is transparent such that the interior elements of device 100 are visible. Also shown in FIG. 5 is position sensor 160, which is operably coupled to device 100. In one embodiment, device 100 has a diameter of 2.75 inches, a flange diameter of 3.25 inches and a length of 7.08 inches. It should be appreciated that embodiments of device 100 include any size provided it operates as set forth herein.

Illustrated in FIG. 6 is an exemplary flow path of fluid that passes through passageways 146 when embedded magnet actuator 116 is caused move towards pump A and accumulator 112. In this embodiment, the arrows within passageways 146 illustrate that fluid will drain from accumulator 112 and move through pump A toward to passageway 146 toward cylinder 104 and cavity A. In should be appreciated that in the embodiments depicted in FIGS. 5-6, 9-11, and 13-20, cylinder 104 is a is a double acting cylinder (as opposed to the single acting cylinder 104 as shown in FIGS. 2-3). Embodiments of the double acting cylinder and the single acting cylinder include double acting actuators and single acting actuators, respectively. It should be appreciated that embodiments of the double acting cylinder and the single acting cylinder are not limited to cylinders, but include vanes and actuators that are not cylinders. Here, cylinder 104 includes a cavity A and a cavity B that are each operable to maintain a fluid and have such fluid moved into and out of such cavity. It should also be appreciated that due to the arrangement of rod 140 with respect to the pump pistons 168, 126 and check valves 120*c*, 172 disposed in pumps A and B as depicted in FIGS. 5-7, 9-15, and 21-25, the embedded magnet actuator 116 is operable to charge the pump pistons 168, 126 with fluid when it compresses the pistons away from the neutral position while their respective springs are operable to pump fluid through the system upon return to their neutral or centered position. FIG. 7 illustrates a close-up view of pump A. Pump A is adjacent to rod 140 and rod pin 164. Pump A piston assembly 166 that includes a spring loaded check valve having a pump piston 168, ball holder 170, a ball 172, a first spring 174 and a second spring 176. Ball 172 is maintained within port 178 of pump piston 168 by first spring 174 obstructing a flow of fluid therethrough. The location of pump piston 168 is maintained by spring 176. When rod 140 with rod pin 164 moves towards pump piston 168, second spring 176 is compressed and the fluid is allowed to flow. In one embodiment, pump A piston assembly 166 can be replaced with a shuttle valve pump piston assembly 178 (shown in FIG. 8*a*) or pump piston assembly 178 having a reed valve 180 (shown in FIG. 8*b*). Rod pin 164 slidably disposed within body 500 (shown in FIG. 7) and isolates the fluid within core tube 138 from fluid within pump A by preventing fluid from passing between the interior of the core tube 138 and pump A. It should be appreciated that the portion of rod 140 adjacent pump B does not include a rod pin. As such, fluid is able to flow between the core tube 138 and pump B.

Reference is now made to FIGS. 9-15, which illustrate an exemplary device 100 having two drain valves 152*a*, 152*b*. In this embodiment, cavity A of double acting cylinder 104 is fluidly connected to drain valve 152*a* via passageway 146*d*. Similarly, cavity B is fluidly connected to drain valve 152*b* via passageway 146*e*. Drain valves 152*a*, 152*b* are operable to allow a flow of fluid from cavities A and B to accumulator reservoir 150. FIG. 10 illustrates a cross-sectional view of device 100 having two drain valves 152*a*, 152*b* illustrating passageway 146*f* from pump B to cavity B. In this embodiment, passageway 146*f* includes a check valve 120*e*. FIG. 11 illustrates a cross-sectional view of device 100 having two drain valves 152*a*, 152*b* with passageways 146*g* from accumulator 112 to an inlet of pump B. Referring to FIG. 12, shown is device 100 having two drain valves 152*a*, 152*b* illustrating passageway 146*h* from cavity B to drain valve 152*a*. Here, a pilot piston will open the drain valve 152*a* to drain cavity A of double acting actuator from passage 146*d* to the accumulator reservoir 150 in response to the fluid pressure in cavity B.

Reference is now made to FIG. 13, which illustrates an exemplary block diagram of device 100. It should be appreciated that the lines connecting the block elements illustrated in the block diagrams depicted herein represent the passageways that allow fluid to flow therebetween and therefore fluidly connect such block elements. In this embodiment, device 100 is operable to charge the single coil embedded magnet solenoid and move an armature either towards pump A or pump B to allow a flow of fluid toward the other pump that has not been compressed. In this embodiment, device 100 includes relief valve A and relief valve B. Relief valve B is fluidly connected to the accumulator and the inlet of Pump B and can drain fluid from cavity B of the double acting cylinder. Relief valve A is fluidly connected to the accumulator and the inlet of pump A and can drain fluid from cavity A of the double acting cylinder. Device 100 shown in FIG. 14 operates similarly that shown in FIG. 13, however, there are no relief valves in this embodiment. In the embodiment shown in FIGS. 4, 13-15, and 22-25 each pump limits the maximum pressure by using the spring for the pumping. The mechanical limitations of the spring limit the output pressure capability of the pump. FIG. 15 illustrates another exemplary device 100. In this embodiment, pumps A and B include shuttle valves 1502, 1504 rather than a spring loaded check valve.

Referring to FIGS. 16-20, shown are exemplary steps in which the embedded magnet actuator 116 will cause fluid to flow through device 100. The arrows in the passageways in FIGS. 16-20 illustrate the direction of flow of fluid through the paths. It should be appreciated that in the embodiments depicted in FIGS. 15-20 and 26-27, the embedded magnet actuator 116 is operable to pump fluid through the system by compressing the pistons 1602, 1604 (movement away from neutral) while the springs 1603, 1605 within the pistons 1602, 1604 will cause the pistons 1602, 1604 to charge with the fluid when the rod 1606 and armature 1608 from the embedded magnet actuator 116 return to their neutral or centered position. In FIG. 16, the spring 1603, 1605 within the piston 1602, 1604 causes the piston 1602, 1604 to return opening check valve 1610 and charge the pump with fluid or oil. At this point, the check valve 1610 in pump 1604 opens and check valve 1612 will be closed obstructing the flow of fluid to the double acting actuator. When the coil 130 is energized with a first polarity, the embedded magnet actuator 116 pushes the piston of pump 1604 towards the accumulator 112 causing check valve 1610 in pump 1604 to close and check valve 1612 to open which allows the volume of fluid being pumped to flow through check valve 1612 and into the double acting actuator cavity A. The force applied by embedded magnet actuator 116 minus the spring load divided by the pump piston area is the pressure applied to the double acting actuator piston. In FIG. 17, embedded magnet actuator 116 pumps fluid through the system and compresses the springs. Embedded magnet actuator 116 is operable to compress pump B when the coil is operated with a second polarity to allow a flow of fluid through a passageway in communication to double acting actuator cavity B, inlet of drain valve B, and pilot piston of drain valve A (not shown). Also shown is the fluid communication from the accumulator reservoir to inlets of pump A and pump B. The pilot pressure from pump A shown, acts on the piston and opens drain valve B to allow cavity B to drain when pump A is operating and pump B is not. Also shown is the fluid bleed from cavity B to the environment.

In FIG. 18, the embedded magnet actuator 116 is operable to compress pump A to allow a flow of fluid to cavity A. Relief valve A is operable to allow a flow to accumulator 112 if the pressure from the fluid reaches a certain threshold. In FIG. 19, embedded magnet actuator 116 compresses pump B and applies pressure to the pilot piston of drain valve A. This allows a flow of fluid from cavity A to flow through the passageways from double acting actuator cavity A to drain valve A and to the accumulator reservoir fluidly connected at the inlet of pump A. Referring to FIG. 20, shown is an exemplary device 100 having check valves 2002, 2004 intermediate pump A, pump B and relief valve A and B, respectively.

Referring to FIG. 22, shown is a block diagram of an alternative embodiment of device 100. In the embodiment shown in FIG. 22, device 100 includes drain valve A which is fluidly connected to the passageway flowing from the embedded magnet solenoid to check valve 3, and drain valve B which is fluidly connected to the passageway flowing from the embedded magnet solenoid to check valve 2. This arrangement allows the double acting cylinder to remain in a static position when the embedded magnet solenoid is powered off. Also shown in FIG. 22 are two controlled leaks. Each controlled leak is located past the pilot pistons of drain valve A and B and are fluidly connected to the accumulator reservoir. Embodiments provide that the controlled leaks can allow a flow of fluid at a plurality of different rates. FIG. 22 also depicts two optional check valves. Optional check valves are located in series with the pilot pistons of drain valves A and B, respectively. It should be noted that the optional check valve can be deployed within or integral with the drain valves A and B rather than as a separate element. Referring to FIG. 23, shown is another block diagram of an embodiment of device 100. In this embodiment, device 100 includes a safety drain valve 2300. This arrangement also allows the cylinder to remain static when the embedded magnet solenoid is powered off. The safety drain valve 2300 allows for the fluid to be drained from cavity A if the system loses power allowing the cylinder to move towards cavity A that the oil is being drained from. It should be appreciated that the location of the safety drain valve 2300 with respect to the other elements of device 100 is determined by the fail safe direction required of the double acting cylinder. Embodiments provide that the safety drain valve 2300 can be disposed such that it is operable to drain fluid from cavity B instead of cavity A as depicted in FIG. 23 allowing the cylinder to move towards cavity B that the oil is being drained from. FIG. 23 also illustrates two controlled leaks. In this embodiment, controlled leaks are located past the pilot pistons of drain valves A and B, respectively, and are located in parallel to safety drain valve 2300. Also, shown in FIG. 23 are optional check valves disposed in series with the pilot piston of drain valves A and B, respectively. It should be appreciated that the optional check valve and controlled leaks can be disposed within or integral to Drain Valves A and B, and that the controlled leaks can be located within the pilot piston of drain valves A and B. Reference is now made to FIG. 24, which depicts yet another block diagram of an embodiment of device 100. In this embodiment, the relief valves have been removed from device 100, which limits the maximum fluid pressure in the system. As depicted, pump A and pump B are arranged such that movement of the armature of the embedded magnet solenoid toward either pump A or pump B compresses the spring within their respective pistons. After the pump pistons are compressed and the armature moves back to its center or neutral position, the springs cause the pump pistons to move back to their neutral position thereby pumping fluid through the passageways. Since the springs are causing or forcing the fluid to flow, the upper limits of the force the springs are able to generate act as a cap or maximum for the amount of pressure that can be generated within the device 100. In FIG. 24, controlled leaks at shown as being located past the pilot piston to the accumulator reservoir. Controlled leaks are disposed in series with optional check valves, which are positioned such that they are in parallel with drain valve pilot piston A and B. It should be appreciated that the controlled leaks can be disposed with the pilot piston of drain valves A and B.

Referring now to FIG. 25, depicted is another block diagram of yet a further alternative embodiment of device 100. This embodiment is similar to that found in FIG. 24, however, in this embodiment, device 100 includes a safety drain valve 2300 in addition to having drain valves A and B. It should be appreciated again that the location of the safety drain valve 2300 is determined by the fail safe direction required of the double acting cylinder towards the cylinder the oil is being drained from by the safety drain valve. Embodiments of the safety drain valve 2300 include it being located within device 100 such that it is operable to drain fluid from cavity B instead of cavity A as depicted in FIG. 25. Similar to FIG. 24, FIG. 25 includes controlled leaks being located past the pilot piston to the accumulator reservoir in parallel with optional check valves. Optional check valves illustrated in FIG. 24 are located in parallel to drain valve pilot piston A and B, respectively. It should be noted that the optional check valve and the controlled leaks can be deployed within drain valves A and B. The controlled leaks can be disposed within the pilot piston of drain valves A and B. Referring to FIG. 26, shown is another block diagram of another embodiment of device 100. In this embodiment, device 100 includes check valves 2 and 5. Check valve 2 is disposed between pump B and cavity B of the cylinder and its outlet is connected to relief valve B inlet and cylinder cavity B. Check valve 5 is disposed between pump A and cavity A of the cylinder and its outlet is connected to relief valve A inlet and cylinder cavity A. As indicated by the dotted line in FIG. 26, Drain valve A pilot section is connected between check valves 1 and 2. As indicated by the dotted line in FIG. 26, Drain valve B pilot section is connected between check valves 4 and 5. FIG. 26 also illustrates controlled leaks located past the pilot piston to the accumulator reservoir. In this embodiment, controlled leaks are disposed in series with optional check valves. Optional check valves are disposed in series with the pilot piston of drain valves A and B, respectively. It should be noted that the controlled leak and optional check valves can be located within the drain valves A and B. The controlled leaks can be deployed within pilot pistons A and B. FIG. 27 presents a block diagram of device 100 similar to that found in FIG. 26. However, in this embodiment, there is a safety drain valve 2300 disposed in parallel with the drain valve A. It should be appreciated that the location of safety drain valve 2300 is determined by the fail safe direction required of the double acting cylinder. Embodiments provide that the safety drain valve 2300 can be located such that it is operable to drain fluid from cavity B when connected in parallel to drain valve B. As shown, drain valve A pilot is fluidly connected between check valves 1 and 2, and drain valve B pilot is connected between check valves 4 and 5. FIG. 27 illustrates controlled leaks located past the pilot piston to accumulator reservoir and are in series with optional check valves. Optional check valves are disposed in series with the pilot piston of drain valves A and B. It should be appreciated that the controlled leaks can be disposed within the drain valve pilot piston. It should also be noted that the optional check valve can be located within drain valves A and B. One of the controlled leaks is located in parallel with safety drain valve 2300. It should be appreciated that in each of the embodiments of device 100 illustrated in FIGS. 22-27, the double acting cylinder is operable to remain in a static position when the embedded magnet solenoid is powered off.

It should be appreciated that FIGS. 28-30 show additional embodiments of device 100 in which pilot operated logic control valves that control the motion of the embedded magnet actuator when it receives a pressure signal from the solenoid pumping system as previously described herein to the control valves as described and shown herein. FIG. 27 illustrates an embodiment of device 100 that utilizes two three-way pilot operated valves, which are typically in the closed position. FIG. 29 shows an embodiment that utilizes two three-way pilot operated valves that are typically in the open position. FIG. 30 shows one 3-position, 5-ported, spring centered pilot operated valve.

Reference is now made to FIGS. 31 and 32, which depict block diagrams of exemplary electro-hydrostatic actuator assembly 3100 having a first accumulator 3108 and a second accumulator 3110. Shown in FIGS. 31 and 32 are electro-hydrostatic actuator assembly 3100 having a cylinder body 3102 (shown in FIG. 33). Cylinder body 3102 includes a single acting cylinder 3104 (shown in FIG. 31) and a fill port 3106. Alternatively, cylinder body 3102 includes a double acting cylinder 3204 (shown in FIG. 32). Electro-hydrostatic actuator assembly 3100 also includes a first accumulator 3108, a second accumulator 3110, a first piston pump 3112, a second piston pump 3114, an embedded magnet actuator 3116, a pressure isolation pin 3118, a first check valve 3120, a second check valve 3122, a release valve 3124, a 3-way pilot operated valve 3126 and an air bleed valve 3128. Embodiments include orifices 3130, 3132. It should be appreciated that single acting cylinder 3104 includes a position sensor 3105 operable to sense a position of the location of the single acting cylinder 3104.

Embedded magnet actuator 3116 is similar to that embedded magnet actuator 3116 described above. However, in this embodiment, embedded magnet actuator 3116 is operable to activate first piston pump 3112 and second piston pump 3114. In this embodiment, passing current through its coil 3134 of embedding magnet actuator 3116 in a first polarity direction will cause armature 3136 to move toward the first piston pump 3112 in a first direction. This will cause the first check valve within first piston pump 3112 to open and allow a flow of fluid through it. Movement of armature 3136 toward first piston pump 3112 in the first direction will also cause pressure isolation pin 3118 to compress first pump spring 3138 and will draw or urge fluid from the first accumulator 3108.

When current through coil 3134 stops, armature 3136 will return to a centered or neutral position within embedded magnet actuator 3116 such that it is not acting on either first piston pump 3112 or second piston pump 3114. When armature 3136 is moving toward the neutral position the first pump spring 3138 of the first piston pump 3112 will push or move the first piston pump 3112 in a second direction opposite the first direction towards the second piston pump 3114, and the first check valve 3120 will open allowing a flow of fluid. Movement of the first piston pump 3112 by moving the first pump spring 3138 from the compressed state to an uncompressed state will urge or move fluid in the first piston pump 3112 through the second check valve 3120 into the second accumulator 3110. After the volume of fluid from the first piston pump 3112 has moved to the second accumulator 3110, check valve 3120 will close preventing a flow of fluid.

The second accumulator 3110 is fluidly connected to the second piston pump 3114 via an inlet of the second piston pump 3114 by one of a plurality of passageways within the cylinder body 3102. When current is passed through its coil 3134 of embedded magnet actuator 3116 in a second polarity direction will cause armature 3136 to move toward the second piston pump 3114 in a second direction. The second polarity is opposite the first polarity. The movement of the armature 3136 in the second direction is opposite the first direction. Movement of the armature 3136 to move toward the second piston pump 3114 in a second direction will cause the third check valve 3140 to open and allow a flow of fluid through it. Movement of armature 3136 toward second piston pump 3114 in the second direction will also cause the rod of embedded magnet actuator 3116 to compress second pump spring 3142. This will cause second piston pump 3114 to draw or urge fluid from the second accumulator 3110 via the fluidly connected passageway. When the current ceases to pass through coil 3134 of embedded magnet actuator 3116, armature 3136 will move to the neutral position. The neutral position pertains to a location along the long axis of the embedded magnet actuator 3116 in which armature 3136 is centered and the rod is not compressing both the first piston pump 3112 and second piston pump 3114. The second pump spring 3142 will then move from a compressed state to an uncompressed state, the third check valve 3140 will close. Next, a fourth check valve 3144 will open and allow pressurized flow of fluid into the single acting cylinder 3104. The flow of fluid into the single acting cylinder 3104 each time the second pump spring 3142 is moved from a compressed state to an uncompressed state will correspond to the volume of fluid maintained by the second piston pump 3114 when the second pump spring 3142 is in the compressed state. Accordingly, fluid will stop flowing into the single acting cylinder 3104 when the second pump spring 3142 is in the uncompressed state.

It should be appreciated that embodiments include the fluid pressure created by the first piston pump 3114 when fluid is moved by the first piston pump 3114 from the first accumulator 3108 to the second accumulator 3108 will be at a first level. The fluid pressure created by the second piston pump 3114 when fluid is moved by the second piston pump 3114 from the second accumulator 3108 to the single acting cylinder 3104 will be at a second level. Embodiments include the second level being greater than the first level. In this regard embodiments of the electro-hydrostatic actuator assembly 3100 are operable to create higher levels of fluid pressure than an assembly having only a single accumulator.

Referring to FIGS. 32-35, shown is an alternative embodiment of an electro-hydrostatic actuator assembly 3200 having a cylinder body 3202. Electro-hydrostatic actuator assembly 3200 includes a first accumulator 3208, a second accumulator 3210, a first piston pump 3212, a second piston pump 3214, an embedded magnet actuator 3216, a pressure isolation pin 3218, a first check valve 3220, a second check valve 3222, a third check valve 3223, a release valve 3224, first air bleed valve 3228, and a second air bleed valve 3229. In this embodiment, movement of armature 3236 towards the first piston pump 3212 causes first piston pump 3212 to move fluid from the first piston pump 3212 to the second accumulator 3210 and check valve 3222 to open. The fluid will then move to cavity A 3223 of double acting cylinder 3204. When armature 3236 moves back to a neutral position, first piston pump 3212 is urged by first pump spring 3238 to return to an uncompressed state, which moves fluid into first piston pump 3212 from the first accumulator 3208. When the armature 3236 moves towards the second piston pump 3214, the pressure isolation pin causes the second piston pump 3214 to move fluid from the second accumulator 3210 to cavity B 3225 of the double acting hydraulic cylinder 3204. When the armature 3236 moves back to the neutral position, second piston pump 3214 is urged by second pump spring 3242 to the uncompressed state, which moves fluid into second piston pump 3214 from the second accumulator 3210.

Referring to FIGS. 36-41, shown are exemplary embodiments of a flexible reed valve 4300. An embodiment of reed valve 4300 is also illustrated as reed valve 180 in FIG. 8*b*. Embodiments of flexible reed valve 4300 can be utilized in hydraulic actuators depicted herein, and any type of fluid pumps or fluid pump systems. Embodiments of flexible reed valve 4300 can be used in place of check valves in multiple locations in hydraulic systems and pneumatic systems. Embodiments of a flexible reed valve 4300 include an inlet that allows fluid to flow into the flexible reed valve 4300, and an outlet that allows fluid to flow out of the flexible reed valve 4300. Embodiments of flexible reed valve 4300 are operable to obstruct and prevent the movement or flow of a fluid through a fluid pump or fluid pump system until a threshold pressure (also known as a cracking pressure) is reached on the inlet side of the flexible reed valve 4300. Once the threshold pressure differential (or cracking pressure) is reached between the inlet side and the outlet side of the flexible reed valve 4300, the flexible reed valve 4300 flexes or bends allowing the fluid on the inlet to flow through the flexible reed valve 4300 and out the outlet of the flexible reed valve 4300. If the pressure differential is below the threshold pressure differential then the valve will close and prevent a flow of fluid. If the pressure differential (i.e., the difference between the fluid pressure on the inlet side and the outlet side) of fluid is below the threshold pressure differential, the flexible reed valve 4300 will not allow fluid to flow from the inlet side to the outlet side. In this regard, if the flexible reed valve 4300 allows fluid to flow from the inlet and out the outlet, the pressure from fluid on the inlet side of the flexible reed valve 4300 may decrease below the threshold pressure. Once the threshold pressure on the inlet side of the flexible reed valve 4300 falls below the threshold pressure, the flexible reed valve 4300 will flex or bend in an opposite direction to that which allowed the fluid to flow such that the flexible reed valve 4300 no longer allows the fluid to flow from the inlet to the outlet thereby preventing the flow of fluid through it. In other words, embodiments of the flexible reed valve 4300 are operable to reseal and not allow a flow of fluid once the pressure from the fluid on the inlet side of the flexible reed valve 4300 falls below the threshold pressure.

Referring to FIG. 36, shown is flexible reed valve 4300 located within a pump piston 4302. Flexible reed valve 4300 includes a fixed body portion 4304 and a flexible body portion 4306. Fixed body portion 4304 is located adjacent flexible body portion 4306. Fixed body portion 4304 includes an outer lip that circumscribes the main body portion 4317 of the fixed body portion 4304 and maintains a location of fixed body portion 4304 and flexible body portion 4306 with respect to pump piston 4302. As shown in FIG. 36, fixed body portion 4304 includes a first side 4301, an opposite second side 4303, and an opening 4308. Opening 4308 fluidly connects the side of fixed body portion 4304 opposite the flexible body portion 4306 with the side of fixed body portion 4304 adjacent the flexible body portion 4306. Flexible body portion 4304 (as shown in FIG. 37) includes a flexing portion 4310 and a stationary portion 4312. Stationary portion 4312 is fixedly attached to fixed body portion 4304 and does not flex or bend with respect to fixed body portion 4304. In other embodiments stationary portion 4312 is not fixedly attached to the fixed body portion 4304, but it maintained in place within the passageway through a friction fit. As shown in FIG. 37, stationary portion 4312 is fixedly attached to fixed body portion 4304 by snap fittings 4314. It should be appreciated that embodiments of stationary portion 4312 can be fixedly attached to fixed body portion 4304 by any means that does not cause fluid to leak or pass through flexible body portion 4306.

Flexible body portion 4304 includes a reed or flap 4316. The flexible body portion 4304 include a first side 4305 and an opposite second side 4307. Flap 4316 is located approximately in the center of flexible body portion 4304. Flap 4316 is sized such that it is at least the same or greater size as that of opening 4308 such that flap 4316 obstructs the flow of fluid through opening 4308 (shown in FIG. 38). The location of flap 4316 coincides with that of opening 4308 such that flap 4316 completely overlaps with opening 4308. Flap 4316 is spaced from stationary portion 4313 on three sides 4318 and is connected to stationary portion 4312 along a fourth side 4320. Embodiments provide that flap 4316 is integral with stationary portion 4312 via its connection with side 4320. It should be appreciated that embodiments of provide that flap 4316 take any shape provided that it is connected to stationary portion 4313 in a fashion that allows flap 4316 to bend or flex such that flap 4316 is operable to move away from opening 4308. Flexing or bending of flap 4316 creates at least one passageway 4309 that fluidly connects the first side 4305 and the second side 4307.

In practice, flexible reed valve 4300 is disposed within a pump piston 4302. Pump piston 4302, in the embodiment shown in FIG. 43, is operable increase fluid pressure on the side of flexible reed valve 4300 having the fixed body portion 4304. Once the fluid pressure differential between the fluid on the fixed body portion 4304 and the flexible body portion 4306 reaches a predetermined threshold, the flap 4316 will flex or bend such that flap 4316 moves away from the opening 4308 and fluid is allowed to flow through opening 4308. Once the fluid pressure differential between the fluid on the fixed body portion 4304 and the flexible body portion 4306 falls below the predetermined threshold, the flap 4316 will bend or flex back towards the fixed body portion 4304 obstructing the flow of fluid through opening 4308.

Reference is now made to FIG. 39, which illustrates another embodiment of a flexible body portion 4606 of a flexible reed valve 4600. Shown in FIG. 39 is flexible body portion 4606. Flexible body portion 4606 includes a body 4602 and a plurality of openings 4604. The plurality of openings 4604 provide a passage way from one side of the body 4602 to the other side of the body 4602. In this embodiment, flexible body portion 4606 does not have a single piece or flap that bends or flexes to obstruct fluid flow or allow fluid flow. Rather, flexible body portion 4606 bends or flexes along each of the fingers 4608 that are spaced from one another by the plurality of openings 4604, which allows center portion 4610 to move away from the opening of that is obstructing the flow of fluid. As shown in FIG. 39, flexible body portion 4606 includes three fingers 4608 that form a spiral design.

Shown in FIGS. 40 and 41 are flexible body portion 4606 located within a piston pump 4700. Flexible body portion 4606 is located adjacent to fixed body portion 4602. As shown in FIG. 41, fixed body portion 4612 includes a plurality of openings 4614 that are disposed adjacent to the plurality of openings 4604. Center portion 4610 is sized to be at least the same size or greater than the passageway 4702 of piston pump 4700. In this embodiment, center portion 4610 obstructs a flow of fluid from passageway 4702 until the pressure differential between the fluid in passageway 4702 and fluid on the other side of flexible body portion 4602 reaches a predetermined threshold. Once the pressure differential reaches the predetermined threshold, center portion 4610 will move towards fixed body portion 4612 and away from passageway 4702 such that passageway 4702 is not obstructed and fluid can flow through the plurality of openings 4604 and plurality of openings 4610. The center portion 4610 of flexible body portion 4602 is operable to move with respect to the outer portion 4616 of flexible body portion 4602 by the flexing or bending of the fingers 4604. It should be appreciated that embodiments of the flexible reed valve described herein can be used in place of any of the check valves shown or described herein. Accordingly, embodiments of the flexible reed valve are operable to be used in a fashion in which an embedded magnet actuator can actuate flexible reed valve such that it either (1) causes (i.e., pumps) fluid to move through the system, and the flexible reed valve is charged with fluid when the embedded magnet actuator returns to neutral, or (2) causes (i.e., charges) fluid to move into a piston pump and flexible reed valve causes (i.e., pumps) fluid to move through the system.

It is to be understood that any feature described in relation to any one embodiment may be used alone, or in combination with other features described, and may also be used alone, or in combination with one or more features of any other of the embodiments, or any combination of any other of the embodiments. The presently disclosed embodiments are therefore considered in all respects to be illustrative. Furthermore, equivalents and modifications not described above may also be employed without departing from the scope of this disclosure, which is defined in the accompanying claims

The invention claimed is:

1. An actuator assembly comprising:

a cylinder body having a plurality of passageways;

an accumulator fluidly connected to the plurality of passageways, the accumulator operable to maintain a fluid under pressure and to urge the fluid through the plurality of passageways;

a moveable cylinder fluidly connected to the plurality of passageways, the moveable cylinder operable to move in response to pressure from the fluid; and a solenoid assembly comprising a core tube, an armature, a first magnet, a second magnet, and an excitation coil, the core tube extending through a longitudinal axis, the core tube having a first ferromagnetic end section and a spaced apart second ferromagnetic end section, the armature having a rod extending through the longitudinal axis, the armature disposed longitudinally between the first ferromagnetic end section and the spaced apart second ferromagnetic end section, the first magnet and the second magnet disposed radially outside the core tube, the first magnet separated from the second magnet by a ferromagnetic spacer, the excitation coil located radially outward from the first and second magnets.

2. The actuator assembly according to claim 1, wherein the plurality of passageways fluidly connect the accumulator, the solenoid assembly and the moveable cylinder.

3. The actuator assembly according to claim 2, wherein the accumulator is fluidly connected to the solenoid assembly by a piston, and wherein the moveable cylinder having a drain valve is fluidly connected to the solenoid assembly, wherein the piston is operable to move between an open position and a closed position, and wherein the drain valve is operable to move between a drain open position and a drain closed position.

4. The actuator assembly according to claim 3, wherein the solenoid assembly is operable to move the armature with the rod through the longitudinal axis in response to a current passing through the excitation coil, wherein movement of the armature in one direction will cause the piston to move to the open position, and wherein movement of the armature in a second direction will cause the drain valve to move to the drain open position.

5. The actuator assembly according to claim 4, wherein proximal poles of the first magnet and the second magnet are a like.

6. The actuator assembly according to claim 1, wherein fluid within the solenoid assembly is isolated from fluid within at least one of (i) the accumulator and (ii) the movable cylinder.

7. The actuator assembly according to claim 6, the actuator assembly further comprising at a first flexible bearing fixedly disposed adjacent a first distal end of the rod, and a second flexible bearing fixedly disposed adjacent a second distal end of the rod, wherein the first and second flexible bearing are operable to prevent the armature and rod from contacting the core tube.

8. The actuator assembly according to claim 7, the solenoid assembly further comprising a pressure isolation pin disposed at the first distal end of the rod, the pressure isolation pin operable to prevent pressure from within the core tube from exiting the core tube adjacent the first distal end of the rod.

9. The actuator assembly according to claim 8, the actuator assembly further comprising a check valve disposed in series with the drain valve.

10. The actuator assembly according to claim 9, wherein fluid is prevented from flowing between the solenoid assembly and the cylinder when the solenoid is powered off.

11. The actuator assembly according to claim 10, wherein the moveable cylinder is a double acting cylinder have a first fluid cavity and a separate second fluid cavity, wherein fluid in the first fluid cavity and the second fluid cavity is restricted from flowing from the accumulator.

12. The actuator assembly according to claim 11, wherein the drain valve has a pilot pressure that is fluidly connected downstream from the piston and the check valve, and is upstream from a second check valve that is disposed in series with the moveable cylinder.

13. The actuator assembly according to claim 11, wherein the check valve is disposed in series with the drain valve, wherein the drain valve is disposed fluidly connected downstream from the piston and the check valve, and the drain valve is disposed upstream of a second check valve such that fluid is prevented from flowing from the pilot piston of the drain valve back to a pump during a suction cycle of the pump.

14. An actuator assembly comprising:

a cylinder body having a plurality of passageways;

a first accumulator fluidly connected to the plurality of passageways, the first accumulator operable to maintain a fluid under pressure and to urge the fluid through the plurality of passageways;

a second accumulator fluidly connected to the plurality of passageways, the second accumulator operable to maintain a fluid under pressure and to urge the fluid through the plurality of passageways, the second accumulator fluidly connected to the first accumulator through the plurality of passageways and operable to receive fluid from the first accumulator;

a moveable cylinder fluidly connected to the plurality of passageways, the moveable cylinder operable to move in response to pressure from the fluid; and a solenoid assembly comprising a core tube, an armature, a first magnet, a second magnet, and an excitation coil, the core tube extending through a longitudinal axis, the core tube having a first ferromagnetic end section and a spaced apart second ferromagnetic end section, the armature having a rod extending through the longitudinal axis, the armature disposed longitudinally between the first ferromagnetic end section and the spaced apart second ferromagnetic end section, the first magnet and the second magnet disposed radially outside the core tube, the first magnet separated from the second magnet by a ferromagnetic spacer, the excitation coil located radially outward from the first and second magnets.

15. The actuator assembly according to claim 14, wherein the plurality of passageways fluidly connect the first accumulator, the second accumulator, the solenoid assembly, and the moveable cylinder, and wherein the first accumulator is fluidly connected to the solenoid assembly by a first piston pump, wherein the moveable cylinder is fluidly connected to the solenoid assembly by a second piston pump, and wherein the second accumulator is fluidly connected to the second piston pump.

16. The actuator assembly according to claim 14, wherein the first piston pump is operable to move between an open position allowing a flow of fluid and a closed position not allowing a flow of fluid, and wherein the second piston pump is operable to move between a second pump open position allowing a flow of fluid and a second pump closed position not allowing a flow of fluid, and wherein the solenoid assembly is operable to move the armature with the rod through the longitudinal axis in response to a current passing through the excitation coil, wherein movement of the armature in one direction will cause the first piston pump to move to the open position, and wherein movement of the armature in a second direction will cause the second piston pump to move to the second pump open position.

17. The actuator assembly according to claim 14, wherein fluid within the solenoid assembly is isolated from fluid within at least one of (i) the first accumulator, (ii) the second accumulator, and (iii) the movable cylinder, the solenoid assembly further comprising a pressure isolation pin disposed at a distal end of the rod adjacent the first piston pump, the pressure isolation pin operable to prevent pressure from within the core tube from exiting the core tube adjacent the distal end of the rod.

18. The actuator assembly according to claim 14, wherein fluid is prevented from flowing between the solenoid assembly and the cylinder when the solenoid is powered off.

19. The actuator assembly according to claim 14, wherein the moveable cylinder is a double acting actuator have a first fluid cavity and a separate second fluid cavity, wherein fluid in the first fluid cavity and the second fluid cavity is restricted from flowing from the second accumulator.

* * * * *